(12) United States Patent
Shah

(10) Patent No.: US 7,247,122 B2
(45) Date of Patent: Jul. 24, 2007

(54) DOWNSHIFT IN HYDROSTATIC DRIVE WORK MACHINE

(75) Inventor: Vaibhav H. Shah, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 372 days.

(21) Appl. No.: 11/033,796

(22) Filed: Jan. 12, 2005

(65) Prior Publication Data

US 2006/0150767 A1 Jul. 13, 2006

(51) Int. Cl.
*F16H 61/40* (2006.01)
(52) U.S. Cl. ....................................... 477/68
(58) Field of Classification Search .................. 477/68, 477/69; 74/731.1, 732.1, 733.1
See application file for complete search history.

(56) References Cited

U.S. PATENT DOCUMENTS 5,624,339 A 4/1997 Coutant et al.
6,042,502 A * 3/2000 Cronin et al. .................. 477/68
6,402,660 B1 * 6/2002 Cronin et al. .................. 477/68
2006/0150624 A1* 7/2006 Shah ............................ 60/445
2006/0150809 A1* 7/2006 Shah ............................ 91/472

* cited by examiner

*Primary Examiner*—Dirk Wright
(74) *Attorney, Agent, or Firm*—Liell & McNeil

(57) ABSTRACT

The present disclosure provides a hydrostatic drive work machine, and a method and control module having a control algorithm for performing a downshifting event in the work machine. The method includes the step of inducing a retarded mode in the work machine, if upon commanding a downshift the work machine is not in a retarded mode. The method further includes the steps of adjusting a displacement of each of a variable displacement pump and a variable displacement motor in a hydrostatic drive of the work machine, and increasing pressure on a low clutch of the work machine. The control algorithm includes means for inducing a retarded mode in the work machine, if the work machine is not in a retarded mode upon commanding a downshift, with at least one of a variable displacement motor and a variable displacement pump in a hydrostatic drive of the work machine.

20 Claims, 11 Drawing Sheets

DOWNSHIFT IN HYDROSTATIC DRIVE WORK MACHINE

TECHNICAL FIELD

The present disclosure relates generally to hydrostatic drive work machines, and relates more particularly to a method and software control algorithm for downshifting in such a machine.

BACKGROUND

Hydrostatic or "hystat" drive refers generally to a drive train or a portion of a drive train in a work machine that utilizes hydraulic fluid pressurized by engine rotation as the motive force for propelling the work machine. In a typical design, a pump is driven with an output shaft of the engine and provides pressurized hydraulic fluid to a hydraulic motor, in turn coupled with one or more axles of the work machine. Commonly, both the pump and the motor have a variable displacement, allowing the relative torque and speed applied to a drive shaft of the work machine, and in turn to the wheels or tracks thereof to be varied.

For example, where a work machine operator wishes to provide a relatively high torque to the work machine wheels or tracks, the displacement of the motor will be relatively large such that, at a given hydraulic pressure from the pump, a relatively large force is transferred to the wheels or tracks for each stroke of the motor. Where a relatively lower torque is desired, for example when operating the work machine at a relatively higher velocity, the relative displacement of the motor can be decreased, and its relative stroking speed increased by increasing the pump displacement.

While the combination of a variable displacement pump and variable displacement motor in a hystat drive work machine creates tremendous flexibility in operation, there is room for improvement. In many known designs, the efficiency and smoothness of various operations in the hystat drive system is limited by the physical capabilities of the work machine operator, as well as the limitations of the various system components. In particular, slowing and accelerating the work machine can be relatively rough or inefficient if the operator is not well practiced in adjusting the pump and motor.

Where an operator unwittingly adjusts a pump or motor displacement too quickly, the relatively rapid change in torque provided by the motor to the ground engaging wheels or tracks can be problematic. Excessively high torque, or changes in torque can induce in the work machine an excessively large acceleration or deceleration, or increase or decrease in the same, known in the art as "jerk." Operation of the work machine may thus not only be uncomfortable for the operator but can also risk tipping the machine or spilling materials loaded thereon. Conversely, where an operator adjusts the motor or pump too slowly, he or she risks stalling the work machine, or at least slowing the performance of various tasks unnecessarily.

Highly skilled operators can typically execute various work machine operations relatively rapidly and smoothly. However, many modern hystat systems simply have too many variable components for a single operator to optimally control or monitor a changing pump displacement, motor displacement, throttle position, and other functions. Designers have developed various systems wherein an electronic controller monitors and adjusts one or more of the parts of the hydrostatic drive. While these systems have shown some improvements over earlier designs, the operator is still typically responsible for controlling certain of the components, such that smooth operation and efficiency can still be compromised in many situations.

Co-owned U.S. Pat. No. 5,624,339 shows a method for controlling shift points in a continuously variable transmission that includes a hydrostatic drive path or a combined hydrostatic and mechanical transmission drive path. The mechanical transmission includes a planetary summing arrangement that appears to allow for smooth shift without disruption of torque. Although this strategy and structure appears promising, there always remains room for improving upon the overall combination of work efficiency with rider comfort.

The present disclosure is directed to one or more of the problems or shortcomings set forth above.

SUMMARY OF THE INVENTION

In one aspect, the present disclosure provides a method of downshifting in a hydrostatic drive work machine. The method includes the step of, if upon commanding a downshift in the work machine the work machine is not in a retarded mode, inducing a retarded mode in the same. The method further includes the steps of adjusting a displacement of each of a variable displacement pump and a variable displacement motor in a hydrostatic drive of the work machine, and increasing pressure on a low clutch of the work machine.

In another aspect, the present disclosure provides an article having a computer readable medium with a control algorithm recorded thereon. The control algorithm includes means for inducing a retarded mode in a work machine hydrostatic drive that includes a variable displacement motor and a variable displacement pump, if upon commanding a downshift the work machine is not in a retarded mode.

In still another aspect, the present disclosure provides a hydrostatic drive work machine. The hydrostatic drive work machine includes a variable displacement pump, and a variable displacement motor coupled with the pump. The hydrostatic drive work machine further includes a transmission coupled with the motor. The hydrostatic drive work machine further includes an electronic control module having a computer readable medium with a control algorithm recorded thereon. The control algorithm includes means for retarding the work machine with one or both of the motor and the pump, if the work machine is not in a retarded mode upon commanding a downshift.

DETAILED DESCRIPTION

Figure 1:
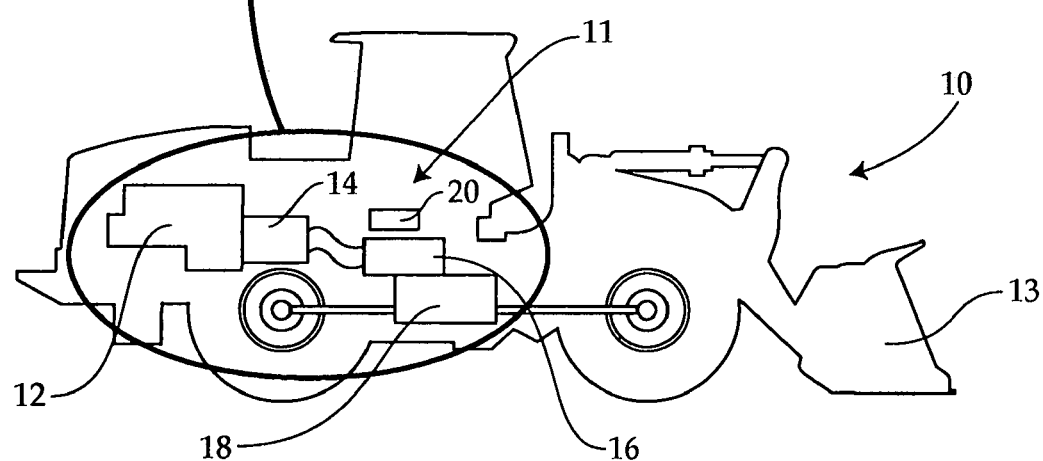
FIG. 1 is a diagrammatic side view of a hydrostatic drive work machine according to a preferred embodiment of the present disclosure.

Referring to FIG. 1, there is shown a hydrostatic drive work machine 10. Work machine 10 includes a hydrostatic drive system 11 disposed therein, including an engine 12, a variable displacement pump 14, a variable displacement motor 16 and a transmission 18 having at least two gears, for example a low gear 18a and a high gear 18b. An electronic control module 20 is further provided, and is operable to electronically control the displacement of pump 14 and motor 16 and engagement of gears 18a or 18b, during downshifting in work machine 10, as described herein. Work machine 10 is illustrated as a front-end loader having a bucket 13; however, it should be appreciated that the design shown in FIG. 1 is exemplary only, and work machine 10 might be any of a wide variety of other hydrostatic drive work machines, many of which are known in the art.

Work machine 10 may be equipped with a set of controls which allow the operator to adjust an engine throttle and control travel direction with a conventional control handle or lever. In one embodiment, the operator will push forward on the control handle to move work machine 10 in a forward direction, and will pull backward on the handle to move work machine 10 in a reverse direction. To place work machine 10 in neutral, the operator may move the control handle to a center position. In certain contemplated embodiments, additional control levers or buttons, for example, will enable the operator to selectively manually adjust various of the work machine components, including one or more of the components of hydrostatic drive 11, as described herein. Upshifting and downshifting of work machine 10 may be commanded by the operator, for example, by moving a control lever between a high gear position and a low gear position, or by depressing one or more buttons. Electronic control module 20 may also be configured to automatically upshift or downshift work machine 10 based on such factors as work machine speed or transmission output speed.

It is further contemplated that electronic control module 20 will be operable to electronically control all of the components of hydrostatic drive 11 when shifting gears without any input from the operator. For certain applications, however, it may be desirable for the operator to have manual control over one or more of the components of hydrostatic drive 11 during shifting. Accordingly, the operator controls can be designed such that an input from the operator will override electronic control module 20. The operator may wish to delay, interrupt or temporarily suspend the various adjustments in hydrostatic drive 11 attendant to shifting. Similarly, the operator may wish to selectively downshift, for example, where electronic control module 20 would not otherwise call for a downshift.

Where work machine 10 is approaching a down grade, for example, the operator may wish to downshift work machine 10 to retard its travel, even if operating conditions would not yet generate an automatic downshift command from electronic control module 20. Work machine 10 may further be equipped with wheel or engine brakes, which when activated may override or supplement actions being taken by electronic control module 20. For example, electronic control module 20 might automatically initiate electronically controlled downshifting if the operator actuates the wheel brakes when traveling in high gear.

Figure 2:
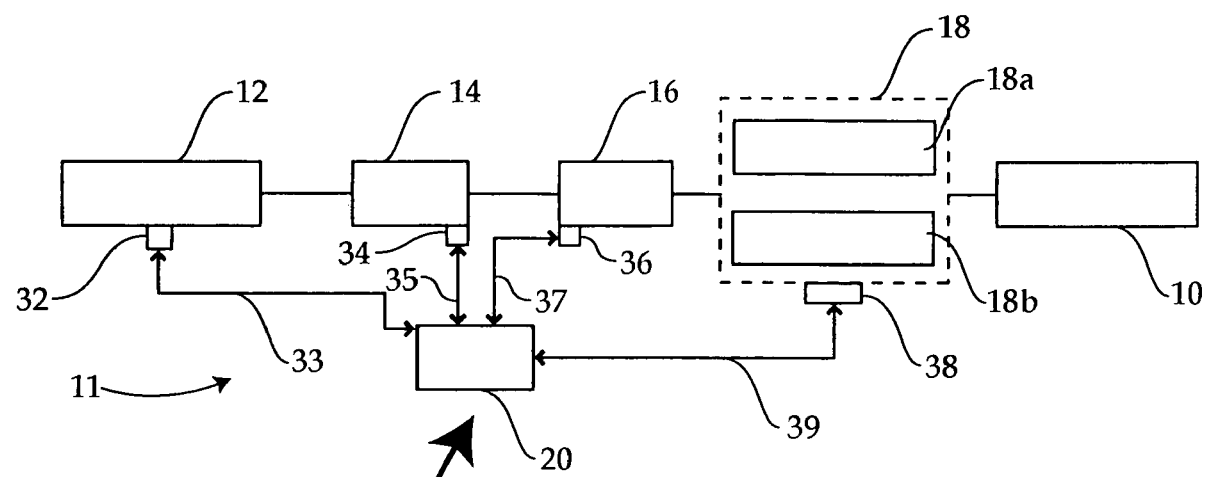
FIG. 2 is a schematic view of a hydrostatic drive and electronic control system suitable for use with the work machine of FIG. 1.

Referring also to FIG. 2, there is shown a schematic of hydrostatic drive system 11. Electronic control module 20 is connected to, and in control communication with, a throttle actuator 32 via a communication line 33. In one embodiment, electronic control module 20 is operable to adjust a position and/or rate of change in position of an engine throttle by adjusting actuator 32. Electronic control module 20 can thus control the fueling and speed of engine 12, or rates of change thereof. Work machine 10 may be further equipped with a conventional throttle control whereby the operator can manually adjust throttle position, for example, utilizing an accelerator pedal.

Another communication line 39 preferably connects electronic control module 20 with a clutch actuator 38. Clutch actuator 38 will typically comprise two clutch actuators, corresponding one with each of gears 18a and 18b. Although work machine 10 is described in the context of a dual-gear transmission 18, those skilled in the art will appreciate that work machines having more than two gears are contemplated as being within the scope of the present disclosure. Electronic control module 20 may be operable to determine the speed of an output shaft of transmission 18, or a value indicative thereof, as described herein.

Work machine 10 may also include conventional clutch pedals or control levers such that the operator can selectively engage or disengage the clutches as desired. In such an embodiment, the operator can manually shift work machine 10 between low and high gears, in either of forward or reverse travel directions. Even where electronic control module 20 automatically controls shifting in transmission 18, work machine 10 may be designed such that the operator can override the electronically controlled shifting, either by simply manually adjusting the clutches or by some other means of disabling the control functions of electronic control module 20.

Electronic control module 20 is further connected to, and in control communication with, a pump actuator 34 via a communication line 35. Control module 20 will typically be operable to adjust a position and/or rate of change in position of pump 14 with actuator 34. Manual controls may be provided in work machine 10 such that the operator can manually adjust pump displacement. Pump 14 may be a bi-directional variable displacement swash plate pump, wherein adjustment of the orientation of a body of pump 14 and pistons disposed therein relative to its swash plate adjusts the displacement thereof, in a manner well known in the art.

The term "bi-directional" should be understood to refer to a pump that is capable of pumping hydraulic fluid in either of two directions. In such an embodiment, the angle of the swash plate of pump 14 relative to the body thereof can vary between a maximum displacement at a first, for example positive, displacement orientation for forward travel of work machine 10, and a second, for example negative, displacement orientation for reverse travel of work machine 10. Where the swash plate is at a zero angle relative to the pump body, the displacement is zero, i.e. the pump is displacing no fluid while rotating, and is placing a minimum load on engine 12. Where the relative swash plate angle is adjusted from the zero angle toward the positive displacement orientation, pump 14 displaces an increasing amount of fluid to motor 16 in a first direction. Conversely, where relative swash plate angle is adjusted toward the negative displacement orientation, pump 14 displaces an increasing amount of fluid to motor 16 in a second, reverse direction. The present disclosure also contemplates other pump types with bidirectional capability by other means known in the art.

The fluid coupling of pump 14 with motor 16 allows a relative swash plate angle of pump 14 to determine the direction and flow rate of fluid that is pumped to motor 16. Thus, moving pump 14 from the positive displacement orientation, through the zero displacement orientation, and finally toward the negative displacement orientation can gradually switch fluid flow from a maximum in the first direction to a maximum in the second direction. In this fashion, adjustment of displacement of pump 14 can reverse the direction that motor 16 is rotating and thus reverse the direction of power to the wheels or tracks of work machine 10, and ultimately the travel direction thereof. Electronic control module 20 may determine pump displacement, for example, by monitoring a position of pump actuator 34.

Yet another communication line 37 connects electronic control module 20 with a motor actuator 36, allowing electronic control module 20 to adjust a position or rate of change in position of motor 16. Motor 16 will typically be a variable displacement motor, and adjustment of motor actuator 36 can thus adjust a relative displacement of motor 16. Electronic control module 20 will typically further be operable to determine a displacement of motor 16 based, for example, upon the position of actuator 36. Motor 16 is similar to pump 14 in that its displacement may be varied by adjusting the relative angle of a drive plate or swash plate associated therewith relative to a plurality of pistons contained within a pump body. Motor 16 may be adjustable between a maximum displacement orientation and a minimum displacement orientation, relatively close to or equal to zero. Thus, motor 16 is not bi-directional, although a bi-directional motor might be used without departing from the scope of the present disclosure. A manual motor controller, for example a control lever, may also be positioned within reach of the operator in work machine 10 such that he or she can manually control motor actuator 36.

Electronic control module 20 includes a computer readable medium having a control algorithm recorded thereon. The control algorithm includes means for inducing a retarded mode in work machine hydrostatic drive 11, if upon commanding a downshift work machine 10 is not in a retarded mode. Inducing the retarded mode in work machine 10 will assist in slowing down prior to downshifting, if desired. If work machine 10 is already in a retarded mode upon commanding the downshift, electronic control module 20 may wait to initiate downshifting to allow the velocity of work machine 10 to first decrease, or electronic control module 20 may immediately initiate downshifting if desired.

The term "retarded mode" should be understood to refer to an operating condition wherein the sum of retarding forces on work machine 10 is greater than a predetermined limit. In other words, work machine 10 may be considered to be in a retarded mode if its travel is impeded by net forces that are, for example, greater than or equal to the predetermined limit, having a tendency to slow work machine 10 by a predetermined amount over a predetermined time period. The predetermined limit that defines the retarded mode threshold may be essentially arbitrary. In other words, the relative magnitude of the net slowing force on work machine 10 at which electronic control module 20 will induce the retarded mode may be a matter of preference for the operator.

For instance, if it is particularly desirable to prolong wheel brake life, the threshold for inducing the retarded mode may be relatively low such that the induced retarding of work machine 10 will assist in slowing work machine 10 relatively more frequently. Similarly, where fuel efficiency is of particular concern, it may be desirable to maximize the efficiency of energy use in work machine 10, and it may be desirable during downshifting to recapture the energy stored in the form of hydraulic pressure in hystat system 11 as frequently as possible. In other situations or environments, the threshold for inducing the retarded mode may be set relatively higher.

The retarded mode may be induced, for example, by adjusting a displacement of at least one of pump 14 and motor 16. Typically, the retarded mode will be induced with electronic control module 20 by commanding at least one of, upstroking of motor 16 toward an increased displacement, and downstroking pump 14 toward a decreased displacement. Each of pump 14 and motor 16, if adjusted to induce the retarded mode, will typically be adjusted at rates based at least in part on one or both of a predetermined acceleration limit and a predetermined jerk limit of work machine 10.

The predetermined acceleration limit can be generally understood to be the maximum rate at which it is desirable to change the velocity of work machine 10, by either slowing down or speeding up. While the predetermined acceleration limit can vary based on numerous factors, described herein, peak accelerations of approximately positive or negative 0.2 g or less have been found to be both attainable and acceptable in work machine 10. Thus, in one embodiment, the predetermined acceleration limit might be set at approximately 0.2 g.

Jerk is the rate of change in acceleration and, hence, the jerk limit can be generally understood to be the maximum rate at which it is desirable to increase or decrease the acceleration of work machine 10. Jerk values of approximately positive or negative 1.0 g/s or less have been found to be attainable and acceptable in work machine 10. Thus, in one embodiment, the predetermined jerk limit might be set at approximately 1.0 g/s. Those skilled in the art will recognize that these numbers reflect satisfactory perceptions from most operators most of the time, and are exemplary only. There will often be a minority of operators that are more aggressive or less aggressive. Other considerations could be utilized in arriving at these predetermined limits. For instance, these limits might be regulated by a government agency.

It should be understood that it is generally desirable, though not required, that downshifting in work machine 10 take place as rapidly as practicable without exceeding the predetermined acceleration and jerk limits. Thus, motor displacement, and pump displacement, where adjusted, will be changed at rates which yield changes in work machine velocity and acceleration that are as close as practicable to the predetermined acceleration limit and jerk limit, respectively, without exceeding the same.

As used herein, the terms predetermined acceleration limit and predetermined jerk limit should be further understood to include quantities that are calculated, inferred or estimated on-the-fly, i.e. during operation, as well as such quantities as may be determined by simulation, or from one or a small number of test machines, and applied broadly to a line of similar or identical work machines. In other words, the predetermined acceleration limit and predetermined jerk limit might be determined by calculating limits specific to an individual work machine, for example, by field testing, then programming control module 20 accordingly. Such parameters might further be calculated or selected based upon different operating conditions, in real time, for example with different types of work machines or work machine bucket loads. A relatively high friction surface such as pavement might call for a different acceleration limit or jerk limit than a relatively low friction surface such as ice or snow.

Alternatively, where it is desirable to preprogram a plurality of control modules prior to assembling them with a plurality of respective work machines, each control module may be programmed with predetermined acceleration and jerk limits broadly applicable to more than one work machine, irrespective of minor hardware or operating differences and operating or environmental conditions.

It is contemplated that the latter instance, i.e. preprogramming the electronic control modules of plural work machines based on preexisting data, will be a practical implementation strategy. The particular operating parameters may be determined by actual tests on a machine, for example, utilizing one or more accelerometers and incorporating the determined limits into the control software, or by computer simulation that models various operating conditions, or by a combination of both approaches.

In one contemplated embodiment, the acceleration and jerk limits will be determined through skilled operator testing. Over the course of many hours of work machine operating experience, operators can develop relatively repeatable shift procedures, based generally on their own preferences. Thus, to determine a limit such as an acceleration or jerk limit, an operator will perform a specific task, such as bringing a work machine to a stop as quickly as they wish, or as quickly as is comfortable. The work machine can be equipped with various monitoring devices, such as accelerometers, to allow the operating parameters of each event to be recorded. Numerical values for a maximum desirable acceleration and/or jerk can thus be determined, and later programmed into electronic control module 20.

It is further contemplated that skilled operator testing might be used to arrive at the threshold for inducing the retarded mode. For example, operators may be tasked with downshifting a work machine under various conditions of retardation. Similar to the process of determining the acceleration and jerk limits, operators will repeat a downshift numerous times, varying between instances wherein a retarded mode is induced, and those where a retarded mode is not induced. The operating conditions may further be varied, for example by changing the work surface, to vary the net retarding forces on work machine 10. Numerical values for the threshold of net retarding forces can then be determined, and later programmed into electronic control module 20.

Further, in certain jurisdictions it may be required to limit jerking and excessively accelerating a work machine and its operator. Thus, externally provided limits might be used in conjunction with the present disclosure to arrive at the acceleration and jerk thresholds programmed in the control algorithm of electronic control module 20. In a similar vein, customer or operator requests for relatively more or less aggressive shifting might be incorporated into the control software, even if some smoothness or efficiency must be sacrificed. Thus, while it is contemplated that a balance of smoothness and efficiency will be sought when setting the predetermined acceleration and jerk limits, as well as the threshold for inducing the retarded mode, it should be understood that this balance may vary depending upon many different factors, as described herein.

Returning to the control algorithm of electronic control module 20, the control algorithm may further include means for decreasing a high clutch pressure, and subsequently increasing a low clutch pressure in work machine 10. In most embodiments, the offgoing, or high clutch pressure may be decreased at a predetermined rate. If offgoing clutch pressure is reduced too quickly, the torque provided thereto from motor 16 may cause the high clutch to slip, creating or increasing a window of time wherein little or no torque is being transferred between transmission 18 and motor 16, and in effect little or no retarding force is applied to work machine 10. If offgoing clutch pressure is reduced too slowly, downshifting duration may be unnecessarily protracted. The rate of increasing oncoming clutch pressure will typically take place as rapidly as is practicable. It should be appreciated, however, that increasing oncoming clutch pressure too rapidly could in some instances cause jerk or excessive deceleration in work machine 10 where the low clutch locks too quickly. Increasing oncoming clutch pressure too slowly could again unnecessarily protract downshifting.

The means for inducing the retarded mode will generally induce the same for a predetermined time period, allowing work machine 10 to slow as desired prior to actually disengaging or engaging the work machine clutches. Thus, where the retarded mode is induced, pump 16 and motor 14 will typically be adjusted to their decreased and increased displacements, respectively, slowing work machine 10 as much as possible, prior to beginning adjustment of the clutches and downshifting work machine 10.

The control algorithm further preferably includes means for determining if work machine 10 is in a retarded mode, based at least in part on a throttle setting, for example a throttle pedal position, a transmission output speed, and motor displacement. Those skilled in the art will appreciate that many other factors may enter into whether work machine 10 is in a retarded mode, including work surface type, slope, internal friction in work machine 10, etc. Determining transmission output speed, throttle setting and motor displacement, however, has been found to provide a workable implementation strategy for determining generally whether work machine 10 is in a retarded mode. The relative magnitudes of these factors may further be used to select among different available downshifting strategies. Once it is determined that work machine 10 is in a retarded mode, electronic control module 20 may choose among at least four downshifting types, each capable of being implemented by the control algorithm recorded on electronic control module 20.

A first downshifting type, or Shift Type I, may be selected where transmission output speed is greater than a predetermined speed, a throttle setting is above a predetermined limit and the motor displacement is less than a predetermined motor displacement. Shift Type I will typically be selected where work machine 10 is operating at a relatively high throttle, and is not in a retarded mode. Shift Type I will typically include inducing the retarded mode in work machine 10 by upstroking motor 16 and downstroking pump 14, as described herein. Conceptually, Shift Type I may be thought of as desirable in a situation where the work machine is traveling relatively fast, and at high throttle, but relatively low retarding forces are impeding its travel.

Thus, if the foregoing conditions are met, prior to downshifting it may be desirable to first slow work machine 10 by inducing a retarded mode. In a Shift Type I scenario, the relatively high velocity of work machine 10, as evidenced for example by the transmission output speed being above the predetermined speed, will generally mean work machine 10 has a relatively large momentum. The relatively low motor displacement prior to upshifting in a Shift Type I scenario will have relatively little effect in retarding work machine, unless adjusted. With a relatively high throttle setting, engine 12 will typically be running relatively fast, further increasing the difficulty of slowing work machine 10. These factors may combine to create a situation wherein it will be advantageous and effective to utilize hystat 11 to slow work machine 10, prior to downshifting.

Figure 3:
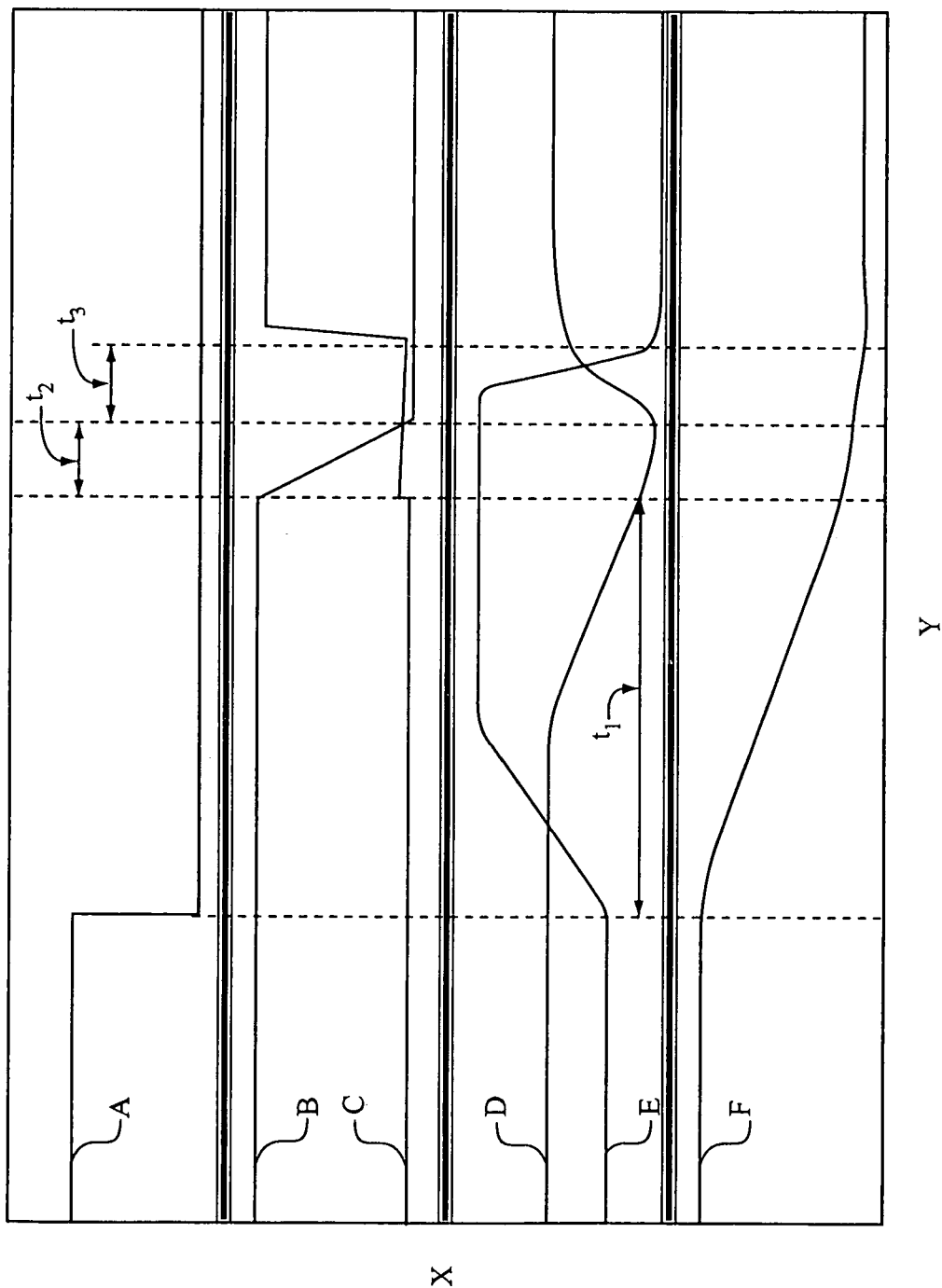
FIG. 3 is a graph illustrating a downshifting event according to one embodiment of the present disclosure.

Referring to FIG. 3, there is shown a graph illustrating an exemplary downshifting event according to Shift Type I. In FIG. 3, the "X" axis represents relative signal values of the various sensors, actuators, etc. associated with the various components of hystat 11 described herein, whereas the "Y" axis represent elapsed time. "A" illustrates a gear signal, for example, a signal sent from electronic control module 20 to actuator 38. "B" represents a high or offgoing clutch pressure, whereas "C" represents a low or oncoming clutch pressure. "D" illustrates a pump displacement whereas "E" represents motor displacement. "F" represents work machine velocity.

A downshifting gear signal is illustrated in FIG. 3 as an essentially instantaneous drop in signal value of gear signal A, initiating a time period $t_1$. Time period $t_1$ represents a duration wherein motor 16 and pump 14 are being adjusted to slow work machline 10. In other words, for Shift Type I a retarded mode will be induced in work machine 10 at the beginning of time period $t_1$. This period may vary, for example, depending upon the relative ground speed of work machine 10 upon commanding a downshift, and the gear ratio between high gear 18b and low gear 18a. For instance, where the gear ratio is relatively large, it may be desirable to slow work machine 10 for a considerable length of time prior to shifting gears. Moreover, hardware size may play a role in determining the length of $t_1$. With a relatively large pump and motor, work machine 10 may slow more quickly than with a smaller pump and motor.

Where electronic control module 20 selects Shift Type I, motor displacement E will typically be increased at the rate described herein, toward an increased displacement. The increasing motor displacement E will increasingly retard work machine 10. Approximately at the time that motor displacement E reaches a maximum displacement, pump displacement D will begin decreasing toward a decreased displacement, also typically at the rate described herein. Meanwhile, work machine velocity F is decreasing at least in part due to the retarding forces provided by motor 16 and pump 14.

At approximately the time where pump displacement reaches its decreased displacement, $t_1$ will end, and $t_2$ will begin. During $t_2$, the high or offgoing clutch pressure will be reduced, at the rate described herein. Following $t_2$, $t_3$ will begin. Time period $t_3$ represents a period where low clutch relative velocity is decreasing. Once low clutch relative velocity reaches approximately zero, the low clutch pressure will be increased at the rate described herein toward a top pressure. During $t_3$, and prior thereto if desired, pump 14 and motor 16 may be adjusted to displacements estimated or calculated to be appropriate once the low clutch becomes engaged. It should be appreciated that the change in gear ratio between high gear 18b and low gear 18a will affect the relative displacements desirable for pump 14 and motor 16 once the low clutch becomes engaged. The torque demands for low gear 18a will be relatively less than the torque demands in high gear 18b and accordingly, the motor and pump displacements E and D, respectively, can be adjusted to displacements anticipated to provide the desired torque in advance of the low clutch actually being engaged. By adjusting motor 16 and/or pump 14 while adjusting low clutch pressure, or while waiting for low clutch relative velocity to reach zero, little or no delay will be required to adjust the torque to a desired level once the low clutch becomes engaged. Once the low clutch is engaged, the downshifting event is completed.

A second downshifting type, or Shift Type II, may be selected where transmission output speed is above the predetermined speed, and throttle setting is above the predetermined limit, but motor displacement is greater than the predetermined displacement. Shift Type II will typically be selected where work machine 10 is operating at a relatively high throttle, but is already in a retarded mode upon commanding the downshift. Conceptually, Shift Type II may be thought of as desirable in a situation wherein work machine 10 is traveling relatively fast, at relatively high throttle, but where motor 16 is available to retard work machine 10 upon commanding the downshift. It may be desirable to slow work machine 10 prior to downshifting, however, because work machine 10 is already in a retarded mode no adjustment of motor 16 or pump 14 will typically take place. Alternatively, downshifting may take place without any delay.

Figure 4:
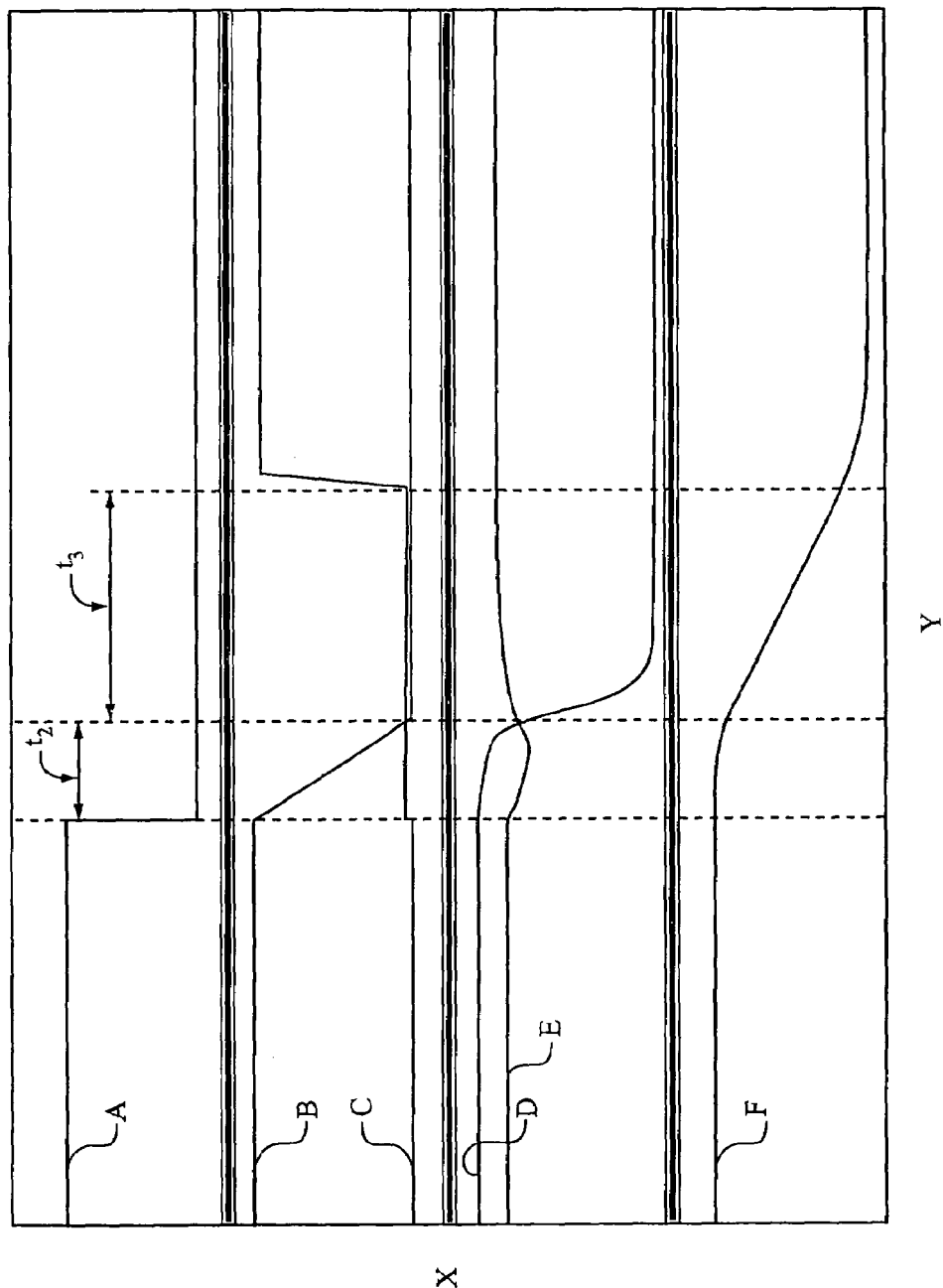
FIG. 4 is a graph illustrating a downshifting event according to yet another embodiment of the present disclosure.

Referring to FIG. 4, there is shown a graph illustrating an exemplary downshifting event according to Shift Type II. In FIG. 4, like characters are used to refer to features and components alike to those shown in FIG. 3. Shift Type II will typically take place without inducing a retarded mode in work machine 10. Accordingly, work machine 10 will typically be in a steady state, or non-shifting state, prior to $t_2$. Once the appropriate change in gear signal A occurs, high clutch pressure B may begin dropping essentially immediately, typically at a constant linear rate. While dropping high clutch pressure B, electronic control module 20 will begin filling the oncoming low clutch C. Following dropping of high clutch pressure B, $t_3$ will begin, wherein low clutch relative velocity drops toward zero. While low clutch relative velocity is dropping, work machine velocity F may slow under the retarding influence of motor 16 and pump 14. Once low clutch relative velocity reaches zero, the low clutch pressure will be increased to completely engage the low clutch and complete the downshift.

A third downshifting type, or Shift Type III, may be selected where transmission output speed is greater than the predetermined speed, the throttle setting is less than the predetermined limit, and the motor displacement is less than the predetermined displacement. Shift Type III is similar to Shift Type I, in that work machine 10 may be thought of as not being in a retarded mode and it is desirable to utilize one or both of pump 14 and motor 16 to slow work machine 10 prior to downshifting. Typically, because of the relatively lower throttle setting in a Shift Type III scenario than in a Shift Type I scenario, it will be relatively easier to slow work machine 10 and, accordingly, only motor 16 might be adjusted to induce the retarded mode.

Figure 5:
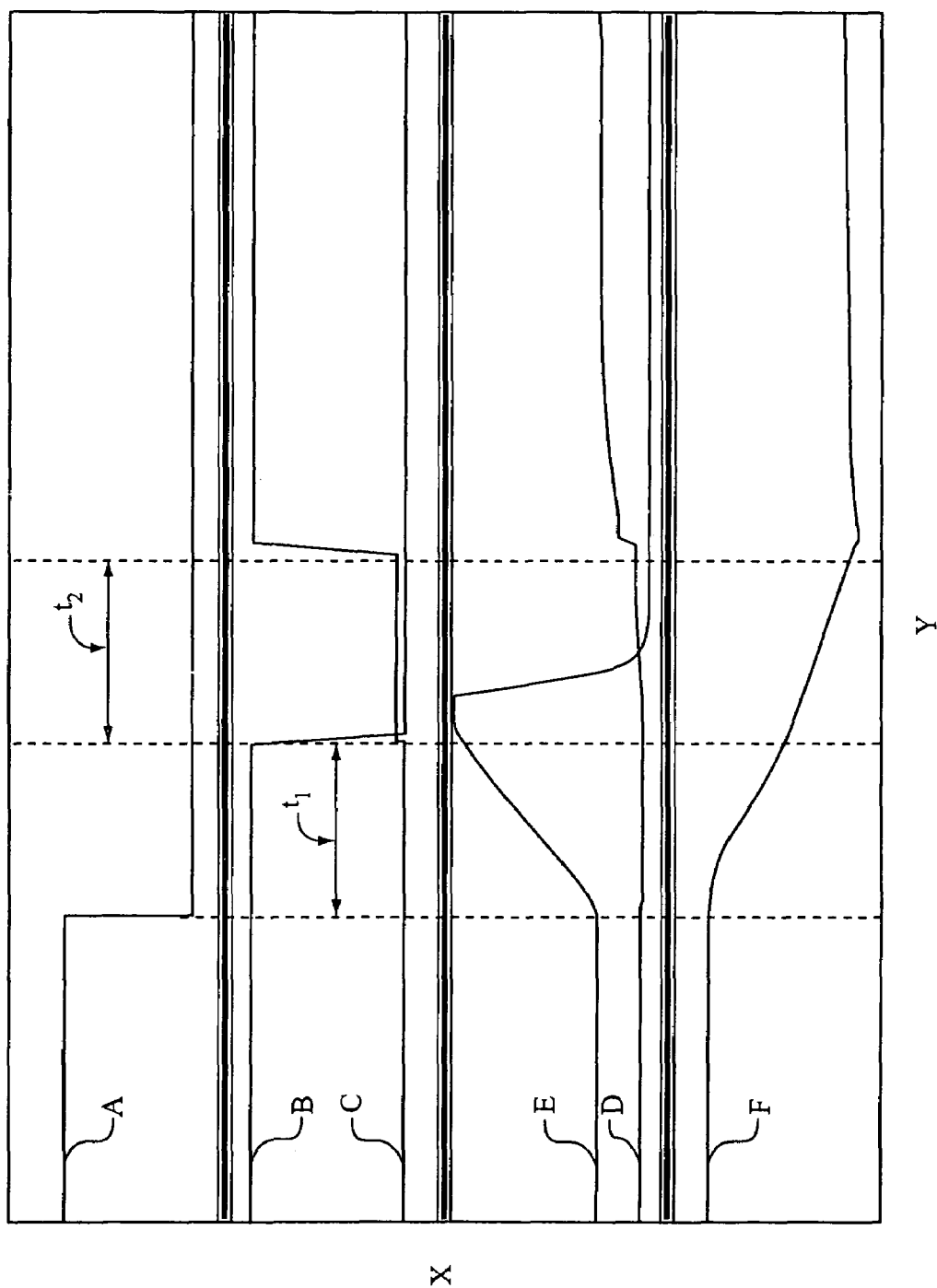
FIG. 5 is a graph illustrating a downshifting event according to another embodiment of the present disclosure.

Referring to FIG. 5, there is shown a graph representing an exemplary downshifting event according to Shift Type III. Like characters are used in FIG. 5 to identify features or components alike to those described with regard to FIG. 3. Shift Type III will typically be similar to Shift Type I, except in that during $t_1$, only motor displacement E is adjusted to slow work machine 10. Pump displacement D typically remains relatively steady. Following slowing of work machine 10 with motor 16 during $t_1$, $t_2$ will begin wherein low clutch relative velocity will typically reach zero, and motor displacement E will be decreased to a point corresponding with the anticipated torque demand once the low clutch is fully engaged. Low clutch pressure may be increased toward maximum pressure following $t_2$. Following $t_2$, low clutch pressure C will be increased toward its maximum pressure and the downshifting event concluded.

A fourth downshifting type, or Shift Type IV, may be selected where transmission output speed is less than the predetermined speed, the throttle setting is below the predetermined limit, and the motor displacement is above the predetermined displacement. Shift Type IV is similar to Shift Type II in that work machine 10 may be thought of as already being in a retarded mode upon commanding a downshift, and adjustment of motor 16 and pump 14 will typically not take place.

Figure 6:
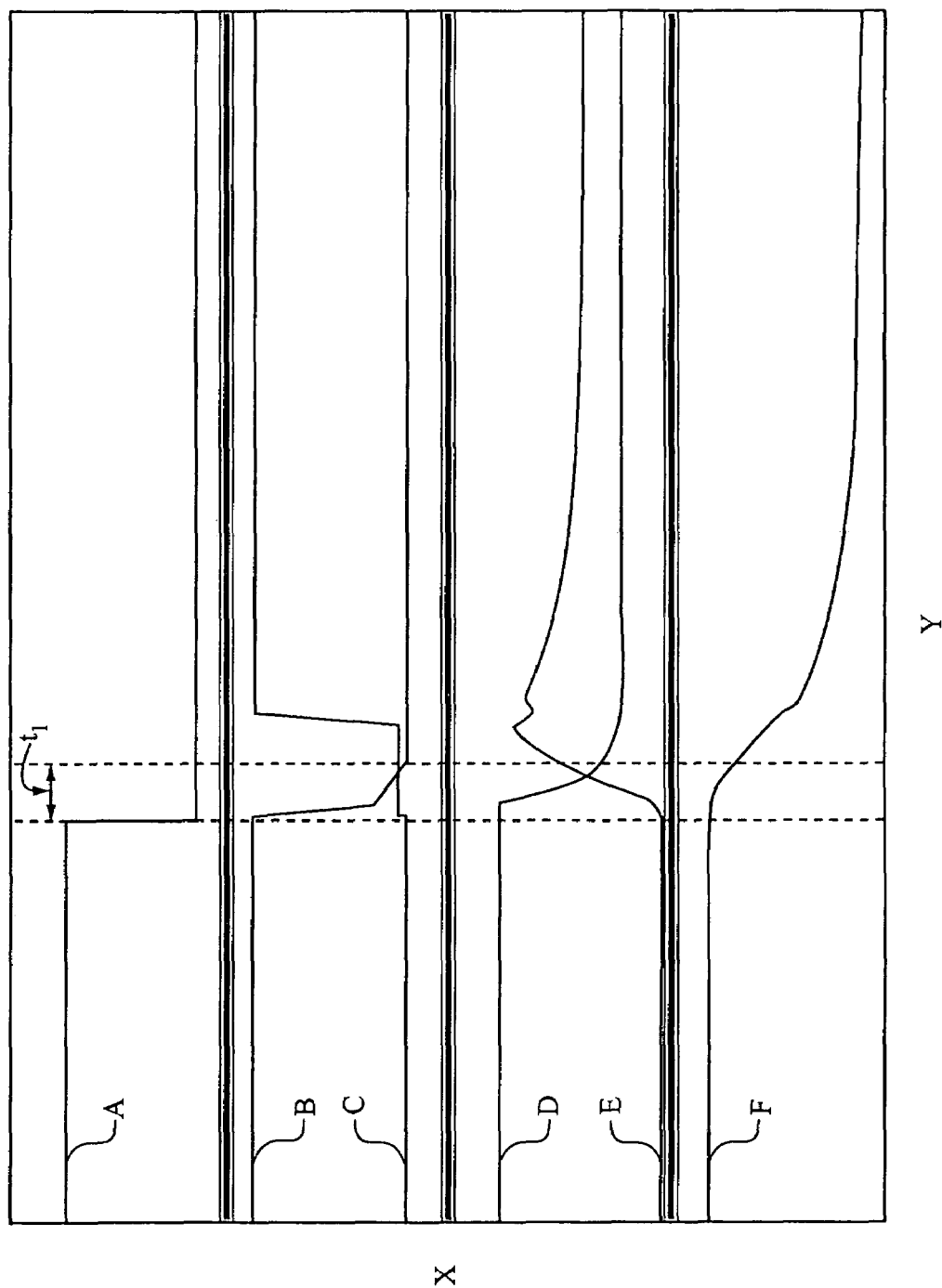
FIG. 6 is a graph illustrating a downshifting event according to yet another embodiment of the present disclosure.

Referring to FIG. 6, there is shown a graph illustrating an exemplary downshifting event according to Shift Type IV. Like numerals in FIG. 6 are used to identify features and components alike to those described in the foregoing FIGS. 3–5. Shift Type IV will typically be similar to Shift Type II, however, with some important differences. It will be recalled that Shift Type IV will typically be selected where transmission output speed and throttle setting in work machine 10 are both relatively lower than in a Shift Type II circumstance. The relatively lower throttle position and relatively lower transmission output speed allow the offgoing clutch pressure B to be lowered relatively more rapidly during a time period ti than in a Shift Type II. This is so because at a relatively lower transmission output speed and relatively lower throttle setting there is less risk of prematurely breaking the offgoing high clutch. Following $t_1$ low clutch relative velocity may be allowed to reach zero, then low clutch pressure C increased toward a maximum pressure.

Electronic control module 20 may be operable to not only select a particular downshifting type, but may also be operable to command adjustment of the various components of hystat system 11 to effect the downshift. In one embodiment, the means for retarding work machine 10 is a first means, operable to selectively adjust displacement of one or both of motor 16 and pump 14 during downshifting, based predominantly on the sum of retarding forces on work machine 10 upon commanding a downshift. To this end, electronic control module 20 may be configured to monitor other relative retarding forces than those inherent in hystat drive 11 such as ground friction, engagement of the wheel brakes or engine brakes, work surface incline, vehicle weight or even oncoming wind speed.

Electronic control module 20 may further include a second means operable to selectively adjust displacement of motor 16 and pump 14 during downshifting, based predominantly on a relative gear ratio of low gear 18a and high gear 18b. It is contemplated that, once work machine 10 has slowed sufficiently to downshift, in either of an induced retarded mode, or simply due to the retarding forces thereon upon initiating the downshift, one or both of pump 14 and motor 16 will be adjusted to different displacements to account for the different torque demands or limits inherent in shifting gears. Thus, where the relative gear ratio between gears 18a and 18b is relatively large, one or both of pump 14 and motor 16 might be adjusted to a projected different demanded torque in work machine 10 based on an impending downshift.

Electronic control module 20 may further include third means for selectively adjusting displacement of motor 16 and pump 14 prior, and subsequent to downshifting. Motor 16 and pump 14 may be adjusted via the third means based predominantly on a work machine ground speed and a throttle setting, respectively. Controlling or adjusting motor 16 and pump 14 thusly will represent a typical, non-shifting condition for work machine 10. Where throttle is increased or decreased or ground speed changes, an increased or decreased torque or speed demand may be placed on pump 14 and motor 16, and the respective components can be adjusted in accord therewith.

INDUSTRIAL APPLICABILITY

Downshifting will typically be carried out where an operator wishes to slow work machine 10. It should be appreciated, however, that downshifting might also be desired where, for example, work machine 10 is traveling down a grade and the operator wishes to limit velocity with hystat system 11 and engine 12. Downshifting may be commanded, for example, where an operator moves a gear shift or control lever to a lower gear position. Alternatively, electronic control module 20 might be configured to automatically downshift, if various operating conditions are met. In such an embodiment, it may also be desirable to provide some means for the operator to inhibit downshifting, if desired.

Turning to FIGS. 7a–7f, there is shown a flow chart 100 illustrating an exemplary downshifting process implementing the control algorithm of electronic control module 20, according to one exemplary embodiment of the present disclosure. The downshifting process will typically begin at a Start, shown as Box 102 in FIG. 7a, corresponding to a downshifting command from the operator of work machine 10, or an automatic downshifting command from electronic control module 20, for example. Box 104 represents sample inputs to electronic control module 20 prior to and during downshifting, including for example, transmission output speed, motor displacement and steady state commanded motor displacement, pump displacement and steady state commanded pump displacement, engine speed, and low and high clutch pressures. Typically, the steady state or non-shifting control logic will remain active during downshifting, thus the various steady state commands will continue to be received by electronic control module 20, however, embodiments are contemplated wherein only the shift logic is enabled during downshifting. Further, while it is contemplated that electronic control module 20 may control operation during shifting as well as steady state, a separate shift controller might be employed if desired. Other sample inputs may include desired gear, throttle position or setting, high and low clutch relative velocities, and an engine underspeed factor.

At Box 106, electronic control module 20 will initialize for downshifting, setting or adjusting the necessary variables to initiate the control process and activate the shift logic. Such variables may include, for example, a trigger, initial gear, a downshifting point, for example, a transmission output speed, displacement and/or rate of change in displacement of pump 14 and displacement and/or rate of change in displacement of motor 16. Initialization variables may further include the respective clutch pressures or changes therein. Engine speed and/or throttle position or setting, and various maximum or minimum allowable pump and motor displacements may also be required to initialize.

Following initialization, in Box 108 the process will verify that initial gear is a high gear, for example, second gear. If instead work machine 10 is already in low gear, the process will exit at Box 109. In Box 110 electronic control module 20 will query whether desired gear is less than the high gear, representing for example a downshifting command from the operator. Also in Box 110, electronic control module 20 will query whether transmission output speed is less than an auto-downshift speed, representing one possible automatic downshift condition, for example. If neither of these conditions exists, the process will exit at Box 111.

If either of the sufficient conditions exist at Box 10, a downshift is detected and a first trigger may exist. Following Box 110, the process will proceed to Box 112, wherein electronic control module 20 will verify whether the first trigger indeed exists. If the first trigger does not exist, the process may proceed to Box 116 to ascertain whether a second trigger exists, described herein. If the first trigger exists at Box 112, the process may proceed to Box 114, wherein electronic control module 20 may determine allowable low limits for pump displacement based on throttle position or setting. In other words, electronic control module 20 may determine in Box 114, based on throttle pedal position, how low pump displacement can be without risking overspeeding engine 12. For a relatively higher throttle position, pump displacement will typically have a relatively higher low limit, as higher throttle will correspond with greater engine speed, and may require greater retarding force from pump 14 to reduce the risk of overspeeding. For a relatively lower throttle position, pump displacement may have relatively lower low limit. Once the allowable low limit for pump 14 is set, a second trigger may exist.

Following Box 114, the process typically proceeds to Box 116, wherein electronic control module 20 may query whether the second trigger exists, for example, corresponding to the allowable low limits for pump displacement being set, as in Box 114. If the second trigger does not exist, the process may proceed to Box 140 to determine whether a third trigger exists, described below.

If the second trigger exists, electronic control module 20 may next proceed to a series of steps, Boxes 118–144, wherein one of a plurality of shift types will be selected, for example, at least four shift types corresponding to Shift Types I–IV above. Those skilled in the art will appreciate that a relatively greater or lesser number of available shift types might be available via the control algorithm of electronic control module 20, however, four has been determined to be a number that gives enough flexibility in downshifting operation to provide a relatively high quality downshift over varying shift conditions, as described herein, and also a practicable number of downshifting types to be implemented by electronic control module 20.

In Box 118 electronic control module 20 will typically query whether transmission output speed is greater than a predetermined speed, whether a throttle setting is equal to or greater than a predetermined limit, and whether present motor displacement is less than or equal to a predetermined displacement. If the conditions are met, the process may proceed to Box 128 wherein a third trigger exists, and a Shift Type I is selected.

If the conditions of Box 118 are not met, the process may proceed to Box 120 wherein electronic control module 20 will typically determine whether transmission output speed is greater than the predetermined speed, the throttle setting is greater than or equal to the predetermined throttle setting, and motor displacement is greater than the predetermined displacement. If the conditions of Box 120 are met, the process may proceed to Box 130 wherein the third trigger exists and a Shift Type II is selected.

If the conditions of Box 120 are not met, the process may proceed to Box 122 wherein electronic control module 20 will typically determine whether transmission output speed is greater than the predetermined speed and whether throttle setting is less than the predetermined throttle setting. If the conditions of Box 122 are met, the process may proceed to Box 132 wherein the third trigger exists, and a Shift Type III is selected.

If the conditions of Box 122 are not met, the process may proceed to Box 124 wherein electronic control module 20 will typically determine whether the transmission output speed is less than the predetermined speed and whether the motor displacement is above the predetermined displacement. If the conditions of Box 124 are met, the process may proceed to Box 134 wherein the third trigger exists and a Shift Type IV is selected.

If the conditions of Box 124 are not met, the process may proceed to Box 126 wherein electronic control module 20 will typically determine whether the transmission output speed is less than the predetermined speed and whether motor displacement is less than or equal to the predetermined displacement. Following Box 126, the process may proceed to Box 136 wherein the third trigger exists, and Shift Type III is selected.

Those skilled in the art will appreciate that the various predetermined limits, speeds, etc. used in selecting among the Shift Types may be selected based on operator preferences. For example, where an operator or customer desires relatively more aggressive slowing of work machine 10, he or she might request a work machine having controls configured such that the retarded mode will be induced at relatively lower thresholds of motor displacement or transmission output shaft speed. For relatively less aggressive shifting, the thresholds may be relatively higher. In other words, slowing of work machine 10 prior to downshifting may be induced at limits based on variable levels of net retarding force thereon.

Once a shift type has been determined, the process will typically proceed to Box 140 wherein electronic control module 20 will typically verify whether the third trigger exists, for example, the foregoing shift type determination. If one of the plurality of Shift Types has not been selected, and thus the third trigger does not exist, the process may proceed via Box H to Box 204, control code output, described below. If the third trigger exists, the process may proceed serially through Boxes 141–144, wherein electronic control module 20 will query which of Shift Types I–IV has been selected. For instance, electronic control module 20 will query whether Shift Type I has been selected in Box 141, Shift Type II in Box 142, Shift Type III in Box 143, and Shift Type IV in Box 144.

Figure 7A:
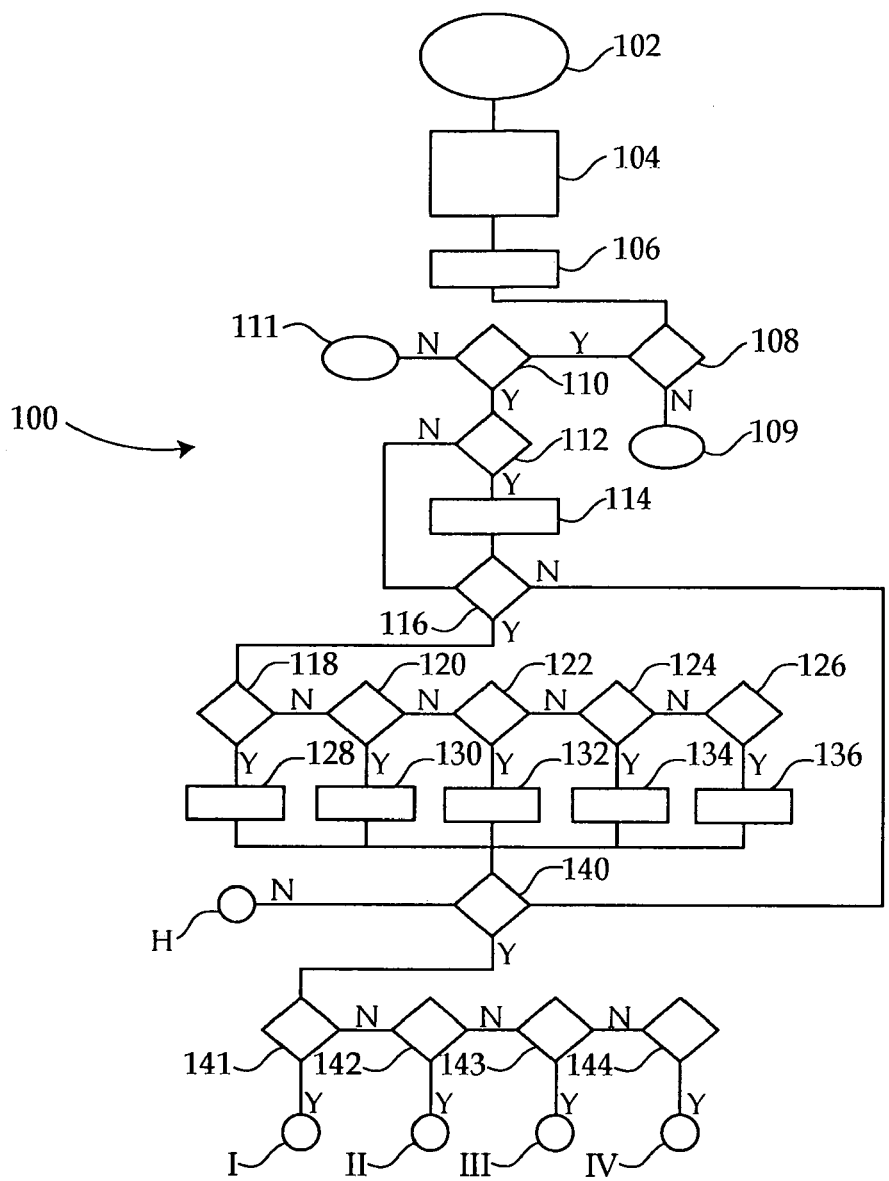
FIG. 7a is a flow chart illustrating a portion of a downshifting process according to one embodiment of the present disclosure.
Figure 7B:
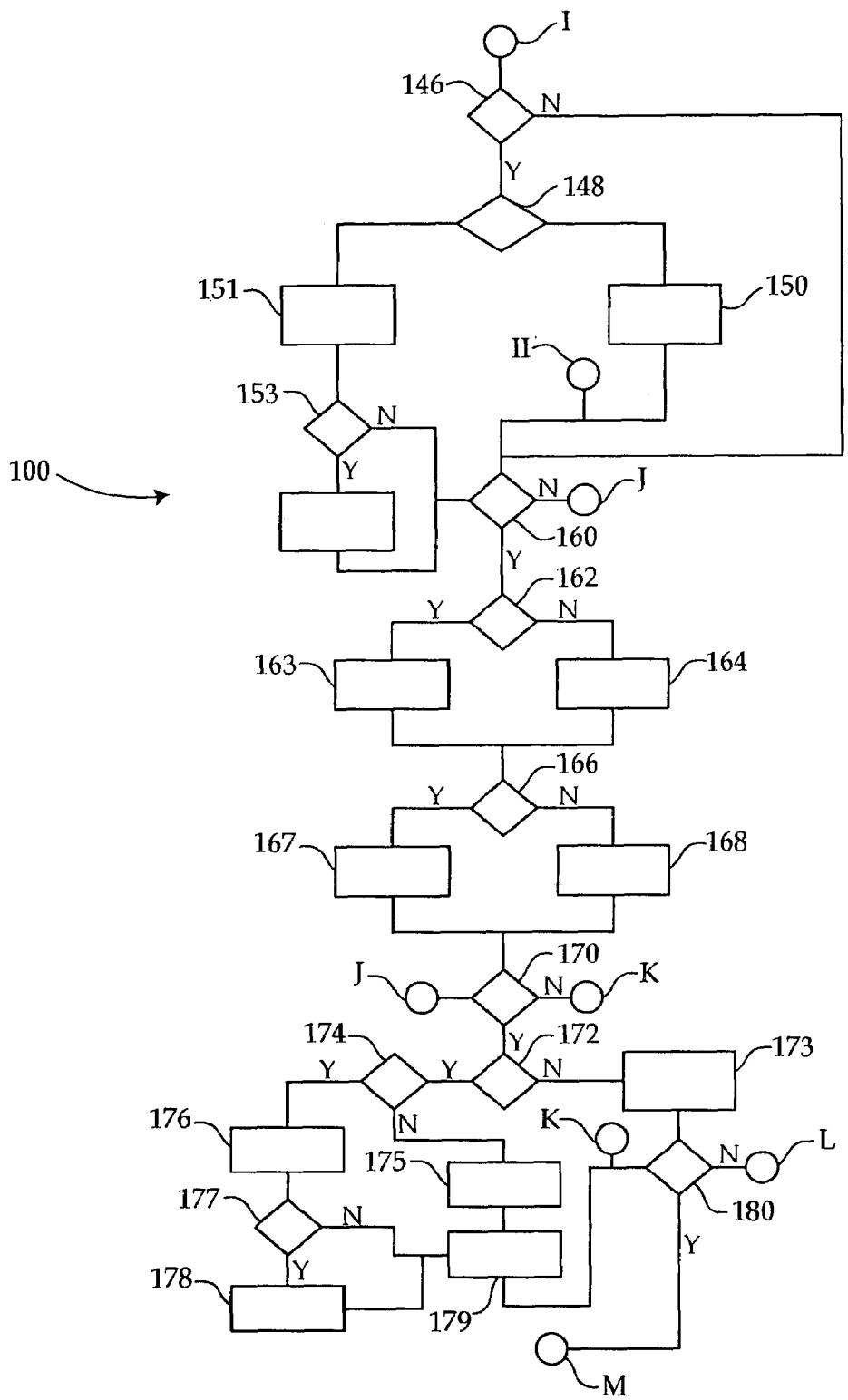
FIG. 7b is a flow chart illustrating another portion of a downshifting process according to the present disclosure.

If Shift Type I is selected, as determined in Box 141, the process will proceed via Box I to Box 146, as shown in FIG. 7b. In Box 146, electronic control module 20 will typically query whether a Shift Type I Step I is appropriate. Step I includes, for example, adjustment of motor 16 and pump 14 to place work machine 10 in the retarded mode, as described herein. If Step I is not appropriate, the process may proceed to Box 160, wherein electronic control module 20 will query whether a Step II is required, described herein.

If Step I is required at Box 146, the process may proceed to Box 148, wherein electronic control module 20 may determine whether engine speed is less than or equal to maximum allowable speed, and whether pump displacement is above a predetermined value. In other words, electronic control module 20 may determine in Box 148 whether the engine is safe from overspeeding. If no, a retarded mode will not be induced in work machine 10, to prevent overspeeding, and the process will proceed to Box 150 without adjusting pump 14 and motor 16, in preparation for Step II. Thus, even if conditions are otherwise appropriate for inducing the retarded mode, Step I, electronic control module 20 may forego inducing the retarded mode to avoid risking overspeeding engine 12.

If in Box 148, electronic control module 20 determines that the retarded mode should be induced in work machine 10, the process will proceed to Box 151 wherein motor 16 may be upstroked at the rate described herein. Subsequently, in Box 153, electronic control module 20 will query whether the motor displacement has reached a predetermined elevated displacement, for example, a maximum displacement. If no, the process will proceed to Box 160 wherein electronic control module 20 will query whether Step II is required, as described herein. Thus, at this point in the process, work machine 10 will typically have been slowed by adjusting motor 16, but if motor 16 has not been adjusted sufficiently, the downshifting process will proceed without adjusting pump 14.

If electronic control module 20 determines in Box 153 that motor displacement has in fact reached the predetermined displacement, the process will proceed to Box 155 wherein electronic control module 20 will begin downstroking pump 14 at the rate described herein. Constant pressure is typically maintained on the offgoing clutch throughout inducing the retarded mode, Step I. From Box 155, the process will proceed to Box 160.

In Box 160, electronic control module 20 may determine whether Step II is appropriate. If no, the process will proceed via Boxes J to Box 170 to determine whether Step III is appropriate. It is at Box 160 that Shift Type II will typically begin. Thus, subsequent to Box 160 Shift Types I and II may be carried out identically. If Step II will be carried out, electronic control module 20 will, generally, verify that the pump displacement is within a desired tolerance of steady state commanded displacement. If so, electronic control module 20 may give control of pump 14 back to the steady state logic. In Step II, electronic control module 20 will further typically verify that high clutch relative velocity is below a desired velocity and, if so will reduce the pressure on the offgoing clutch at a predetermined rate and fill the oncoming clutch. Exemplary operations of Step II are as follows.

If Step II is appropriate at Box 160, the process will proceed to Box 162 wherein electronic control module 20 will typically query whether actual pump displacement is within a desired tolerance of the steady state commanded pump displacement. If no, then the process will proceed to Box 164 wherein pump and motor displacements may be adjusted to their steady state displacements or electronic control module 20 may simply wait to allow the pump and motor displacements to reach displacements within the acceptable tolerance. If the pump displacement is within the desired tolerance at Box 162, then the process may proceed to Box 163, wherein steady state pump displacement equals the pump displacement and motor displacement is unchanged from its most recent displacement. Once determined that pump 14 is at or within the tolerance of its steady state commanded displacement, electronic control module 20 may give control back to steady state logic.

From either of Boxes 163 and 164, the process proceeds to Box 166, wherein electronic control module 20 may query whether high clutch relative velocity is less than a desired number. If no, then the process will proceed to Box 168 wherein electronic control module 20 may determine Step II is appropriate. If the high clutch relative velocity is below the desired number, the process may proceed to Box 167 wherein electronic control module 20 may begin reducing pressure on the offgoing clutch at the rate described herein, and begin filling the oncoming clutch.

From either of Boxes 167 or 168 the process may proceed to Box 170 wherein electronic control module 20 will typically query whether Step III is appropriate. If no, then the process may proceed via Boxes K to Box 180, wherein electronic control module 20 will determine whether a Step IV is appropriate. If Step III will be carried out, electronic control module 20 will, generally, verify that high clutch relative velocity is below a desired number. If yes, then the process may proceed to Step IV. If not, then electronic control module 20 will typically verify whether the steady state commanded displacement is greater than the actual pump displacement. If so, electronic control module 20 will typically upstroke pump 14 at the rate described herein. Once the pump displacement reaches an elevated displacement, for example its maximum displacement, electronic control module 20 will typically downstroke motor 16 at the rate described herein and then drop pressure on the offgoing clutch at the rate described herein, for example, to zero. Exemplary operations of Step III are as follows.

If Step III is desired at Box 170, for example, where high clutch relative velocity has not yet reached the desired number, the process may proceed to Box 172 wherein electronic control module 20 will typically query whether high clutch relative velocity is above the desired number. If no, electronic control module 20 will typically determine that Step IV is appropriate, and the process may proceed to Box 180 to verify the same.

If high clutch relative velocity is greater than the desired velocity, from Box 172 the process may proceed to Box 174 wherein electronic control module 20 will typically determine whether steady state commanded pump displacement is greater than the actual pump displacement. If no, the process may proceed to Box 175 to set the pump displacement to the steady state commanded displacement and motor displacement to steady state commanded displacement, or to simply wait for the pump and motor displacements to reach appropriate values. From Box 175, the process will proceed to Box 179, described below.

If at Box 174, the steady state commanded pump displacement is greater than the actual pump displacement, the process may proceed to Box 176 wherein electronic control module 20 will typically upstroke pump 16 at the rate described herein. In Box 177, electronic control module 20 may verify whether the pump displacement is at the maximum displacement. If no, the process will proceed to Box 175, described below. If the pump displacement is at the maximum displacement at Box 177, the process may proceed to Box 178 wherein electronic control module 20 will typically downstroke motor 16 at the rate described herein. From either of Boxes 175 or 178 the process will proceed to Box 179, wherein electronic control module 20 may begin dropping the offgoing clutch pressure at the rate described herein, for example, until it reaches zero.

From Box 179 the process will proceed to Box 180 wherein electronic control module 20 may determine whether Step IV is appropriate. The process may also proceed to Box 180 from Box 173. If Step IV is not appropriate at Box 180, the process will proceed via Boxes L to Box 200, shown in FIG. 7c, wherein electronic control module 20 will ascertain whether Step V is appropriate.

If Step IV will be undertaken from Box 180, electronic control module 20 will, generally, verify that the high clutch relative velocity is below a desired velocity. If yes, electronic control module 20 will typically increase the oncoming low clutch pressure at the rate described herein. Also in Step IV, electronic control module 20 will typically verify that the steady state commanded pump displacement is greater than the actual pump displacement. If yes, then electronic control module 20 will typically upstroke pump 14 at the rate described herein to a maximum displacement, after which electronic control module 20 will typically downstroke motor 16 at the rate described herein. Exemplary particular operations in Step IV are as follows.

Figure 7C:
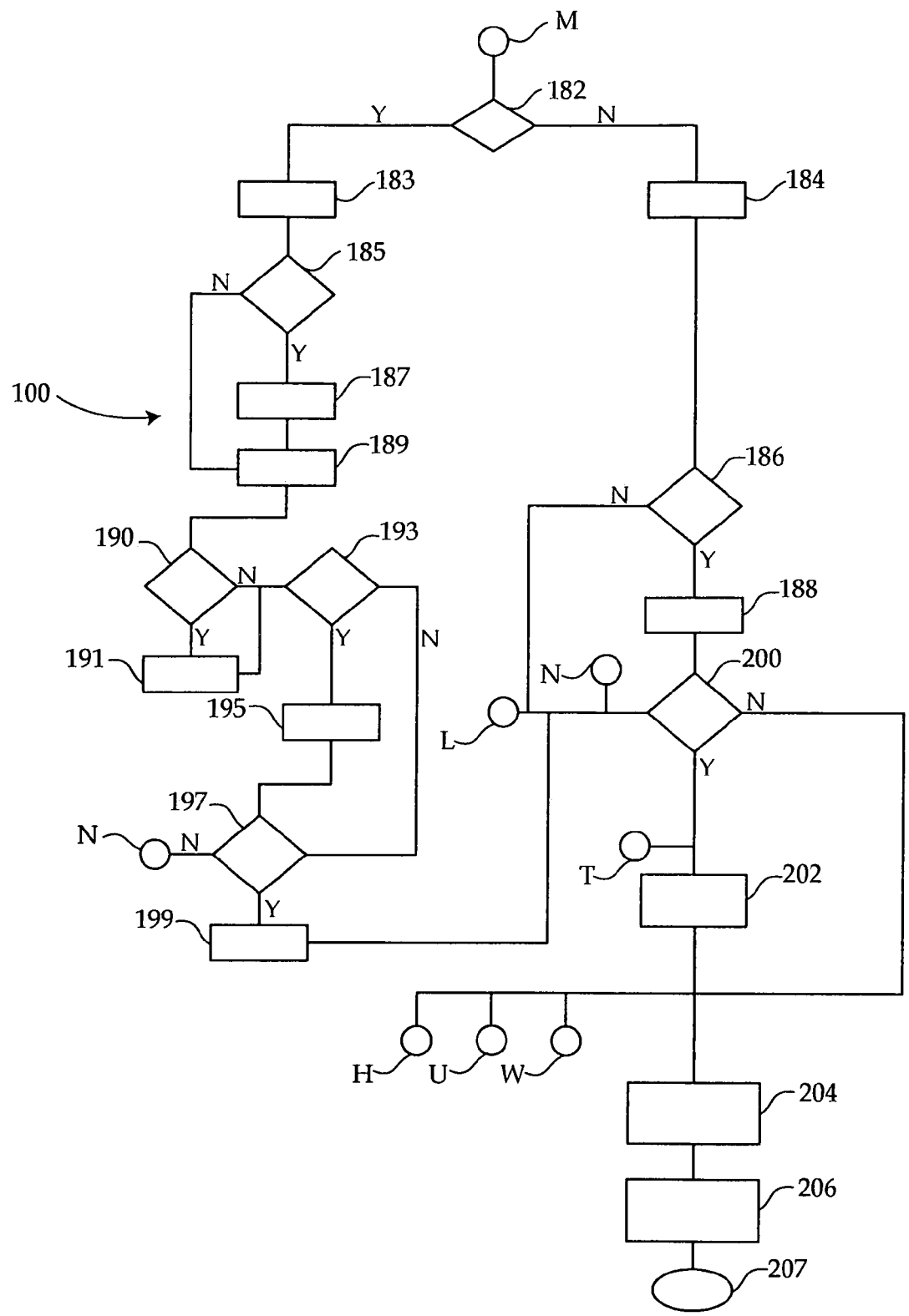
FIG. 7c is a flow chart illustrating another portion of a downshifting process according to the present disclosure.

The process proceeds from Box 180 via Boxes M to Box 182, shown in FIG. 7c. In Box 182, electronic control module 20 may determine whether steady state pump displacement is greater than actual pump displacement. If no, the process may proceed to Box 184 wherein pump displacement may be adjusted as desired, or where electronic control module 20 may simply wait for pump displacement to reach an appropriate level.

If the steady state commanded pump displacement is greater than the pump displacement at Box 182, the process may proceed to Box 183, wherein electronic control module 20 will typically upstroke pump 14 at the rate described herein. Next, in Box 185, electronic control module 20 may verify whether the pump displacement is greater than or equal to the maximum pump displacement. If no, then the process may proceed to Box 189 wherein electronic control module 20 may begin increasing the oncoming clutch pressure. If the pump displacement is at its maximum pump displacement at Box 185, the process may proceed to Box 187 wherein electronic control module 20 may downstroke motor 16 at the rate described herein. Once Box 187 is completed, the process may proceed to Box 189, as described herein.

From Box 189 the process typically proceeds to Box 190 wherein electronic control module 20 will query whether pump displacement is within an acceptable tolerance of steady state commanded displacement. If at Box 190, the pump is within the tolerance, the process may proceed to Box 191, wherein electronic control module 20 will determine the pump displacement is at the steady state pump displacement. If at Box 190, the pump is not within tolerance, the process may proceed to box 193 wherein electronic control module 20 may query whether the motor is within an acceptable tolerance of steady state commanded displacement. If yes, the process may proceed to Box 195 wherein electronic control module 20 may determine the motor displacement is at the steady state motor displacement.

If motor displacement is not within tolerance of steady state commanded motor displacement the process may proceed directly to Box 197 wherein electronic control module 20 will verify whether pump and motor displacements are within the acceptable tolerances, and whether low clutch pressure is at an elevated, typically maximum pressure. If so, electronic control module 20 will typically determine that control should be returned to the steady state logic, for example Step V, Box 199, and verify selection of the same in Box 200. If either of pump 14 and motor 16 are out of tolerance, the process will proceed via Boxes N, also to Box 200, but Step V will typically not occur. As discussed herein with regard to all of the Shift Types, Step V will typically include return of control to steady state logic. Step V might, however, alternatively include the generation of a flag or similar signal in the control process which might, for example, communicate with another control algorithm responsible for determining whether control will be returned to steady state logic. In any event, Step V will typically represent a conclusion of the downshifting event.

Returning to Box 184, it will be recalled that the process arrives at Box 184 if in Box 182, steady state commanded pump displacement is not greater than pump displacement. At Box 184, for example, electronic control module 20 might adjust pump displacement, or simply wait for pump displacement to reach the desired displacement. From Box 184, the process will typically proceed to Box 186, wherein electronic control module 20 may query whether pump and motor displacements are within the acceptable tolerance of steady state commanded displacements, and whether the low clutch pressure is at its elevated pressure. If no, Step V will not be undertaken, and the process will proceed to Box 200. If the respective displacements are within an acceptable tolerance, the process will proceed to Box 188, wherein electronic control module 20 may determine that Step V is to be undertaken.

Figure 7D:
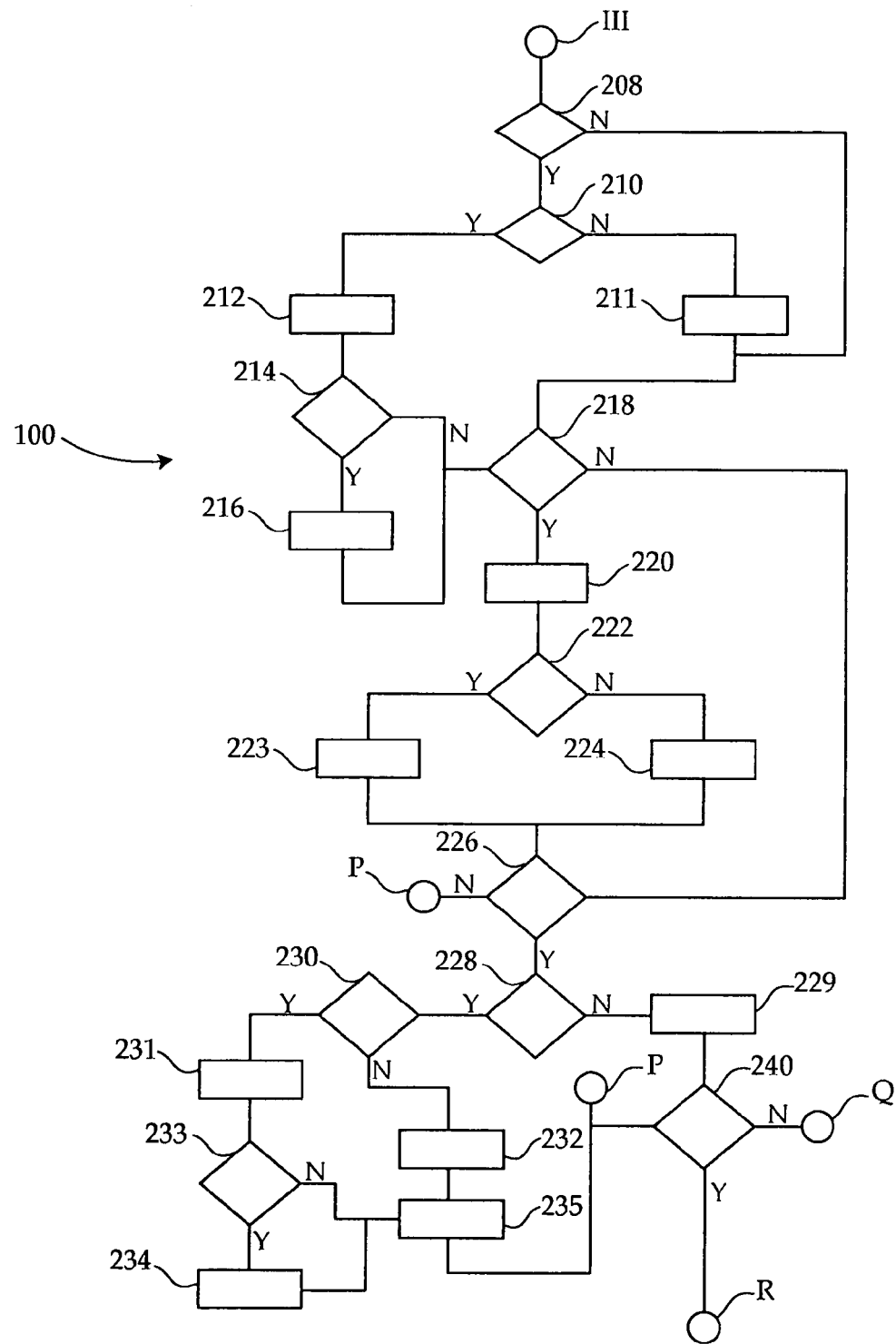
FIG. 7d is a flow chart illustrating another portion of a downshifting process according to the present disclosure.

In Box 200 electronic control module 20 will typically verify whether Step V is to be carried out. If no, the process may proceed directly to Box 204, described below. If Step V is undertaken, the process may proceed to Box 202, wherein electronic control module 20 will set the initial gear as low, for example, and set the trigger as the first trigger. From Box 202, the process may proceed to Box 204, representing an output of the control code, including pump displacement, motor displacement and oncoming clutch pressure. From Box 204, the process may proceed to Box 206, wherein electronic control module 20 will store the values of various parameters, including initial gear, step, trigger, pump and motor displacements, and low and high clutch pressures. Each of Shift Types I or II is thus concluded, the process will typically Exit at Box 207.

Where Shift Type III is selected, the process may proceed from the conclusion of shift detection and selection via Boxes III to Box 208, shown in FIG. 7d, wherein electronic control module 20 will typically verify whether Shift Type III Step I will be undertaken. If no, the process may proceed to Box 218 to ascertain whether a Shift Type III Step II is appropriate. If Step I will be undertaken, electronic control module will, generally, verify that the engine speed is below an allowable limit and that transmission output speed is above a predetermined speed. If these conditions are met, electronic control module 20 will upstroke motor 16 at the rate described herein. Once motor 16 reaches an elevated displacement, electronic control module 20 will typically begin downstroking pump 14 at the rate described herein. The offgoing clutch pressure is typically maintained throughout adjusting pump 14 and motor 16. Following adjustment of pump 14 and motor 16, electronic control module 20 may typically verify that the high clutch relative velocity is below a desired velocity. If so, electronic control module 20 will reduce the pressure on the offgoing clutch at the rate described herein and fill the oncoming clutch. The particular operations of Shift Type III Step I are as follows.

From Box 208 the process may proceed to Box 210, wherein electronic control module 20 will typically determine whether engine speed is less than or equal to the maximum allowable engine speed, and whether transmission output speed is greater than or equal to the predetermined speed. If the conditions are not met, the process will typically proceed to Box 211, wherein electronic control module 20 may determine Step II is appropriate and thenceforth to Box 218, wherein electronic control module 20 will verify whether a Shift Type III Step II is appropriate.

If the conditions at Box 210 are met, then motor 16 and pump 14 can be adjusted without risk of overspeeding the engine, and the process may proceed to Box 212. In Box 212, motor displacement may be increased at the predetermined rate described herein. Next, in Box 214, electronic control module 20 may verify that motor displacement has increased sufficiently. If no, the process may proceed to Box 218. If motor displacement is at or close to its increased, for example maximum, displacement at Box 214, electronic control module 20 may decrease pump displacement at the rate described herein, Box 216. From either of Boxes 214 or 216, the process may proceed to Box 218.

If Step II will not be undertaken, from Box 218 the process may proceed to Box 226 to determine whether a Shift Type III Step III will be undertaken. If Step II is to be carried out, from Box 218 the process may proceed to Box 220, wherein electronic control module 20 will typically maintain pump and motor displacements. Following Box 220, the process may proceed to Box 222 wherein electronic control. module 20 will verify whether high clutch relative velocity is below the desired number. If yes, then the process may proceed to Box 223 wherein electronic control module 20 will reduce the offgoing clutch pressure at the rate described herein, and fill the oncoming clutch. If no, the process may proceed to Box 224 wherein electronic control module 20 will determine that Step III should be carried out.

From either of Boxes 223 and 224, the process will typically proceed to Box 226, wherein electronic control module 20 may verify whether Step III is to be undertaken. If Step III will not take place, then the process typically proceeds via Boxes P to Box 240 to determine whether a Shift Type III Step IV will take place. If Step III is appropriate electronic control module 20 will, generally, verify whether the high clutch relative velocity is below a desired velocity. If yes, then the process will typically proceed through Step IV. If no, then electronic control module 20 may next verify whether the steady state commanded pump displacement is greater than the actual pump displacement. If yes, then electronic control module 20 will upstroke pump 14 at the rate described herein. Once the pump displacement reaches the maximum displacement, electronic control module 20 may downstroke motor 16 at the rate described herein and drop the offgoing clutch pressure at the rate described herein to, for example, zero. The particular operations of Step III are as follows.

From Box 226 the process may proceed to Box 228, wherein electronic control module 20 will typically ascertain whether the high clutch relative velocity is below the desired velocity or, alternatively, whether it is not above the desired velocity. If at Box 228, the high clutch relative velocity is below the desired velocity, the process will proceed to Box 229, wherein electronic control module 20 will determine Step IV is appropriate, and thenceforth to Box 240 to verify the same.

If at Box 228, the high clutch relative velocity is not below the desired value, the process may proceed to Box 230 wherein electronic control module 20 will ascertain whether the steady state commanded pump displacement is greater than the actual pump displacement. If no, the process may proceed to Box 232 wherein electronic control module 20 may allow the pump displacement to drop below the steady state commanded displacement, or adjust the same accordingly. From Box 232, the process may proceed to Box 235, described below. Where steady state commanded pump displacement is above the actual pump displacement at Box 231, electronic control module 20 will upstroke pump 14 at the rate described herein. The process may then proceed to Step 233 wherein electronic control module 20 will typically determine whether pump displacement is greater than or equal to an increased, for example, maximum displacement. If pump displacement is not at the maximum displacement, the process may proceed directly to Box 235. If pump displacement is indeed at the maximum displacement at Box 233, the process may proceed to Box 234 wherein electronic control module 20 may downstroke motor 16 at the rate described herein. From any of Boxes 232, 233 or 234, the process may proceed to Box 235, wherein electronic control module 20 will typically drop the pressure on the offgoing clutch at the rate described herein, for example until the pressure is zero.

From either of Boxes 235 or 229, the process may proceed to Box 240 wherein electronic control module 20 will verify whether Step IV is to be carried out. If Step IV will not take place, the process may proceed via Boxes Q to Box 260, shown in FIG. 7e, to determine whether a Shift Type III Step V, for example, will take place.

If Step IV has been selected at Box 240, electronic control module 20 will, generally, verify the high clutch relative velocity is below a desired velocity. If so, electronic control module 20 will increase the oncoming clutch pressure at the rate described herein. Electronic control module 20 will further verify that the steady state commanded pump displacement is greater than the actual pump displacement. If yes, then electronic control module 20 will upstroke pump 14 at the rate described herein. Once pump displacement reaches an elevated, for example maximum, displacement, electronic control module 20 will typically downstroke motor 16 at the rate described herein. Thereafter, electronic control module 20 will typically verify that pump and motor displacements are within acceptable tolerance of steady state commanded displacements. If so, electronic control module 20 will give control back to the steady state control logic. The particular operations of Step IV are as follows.

Figure 7E:
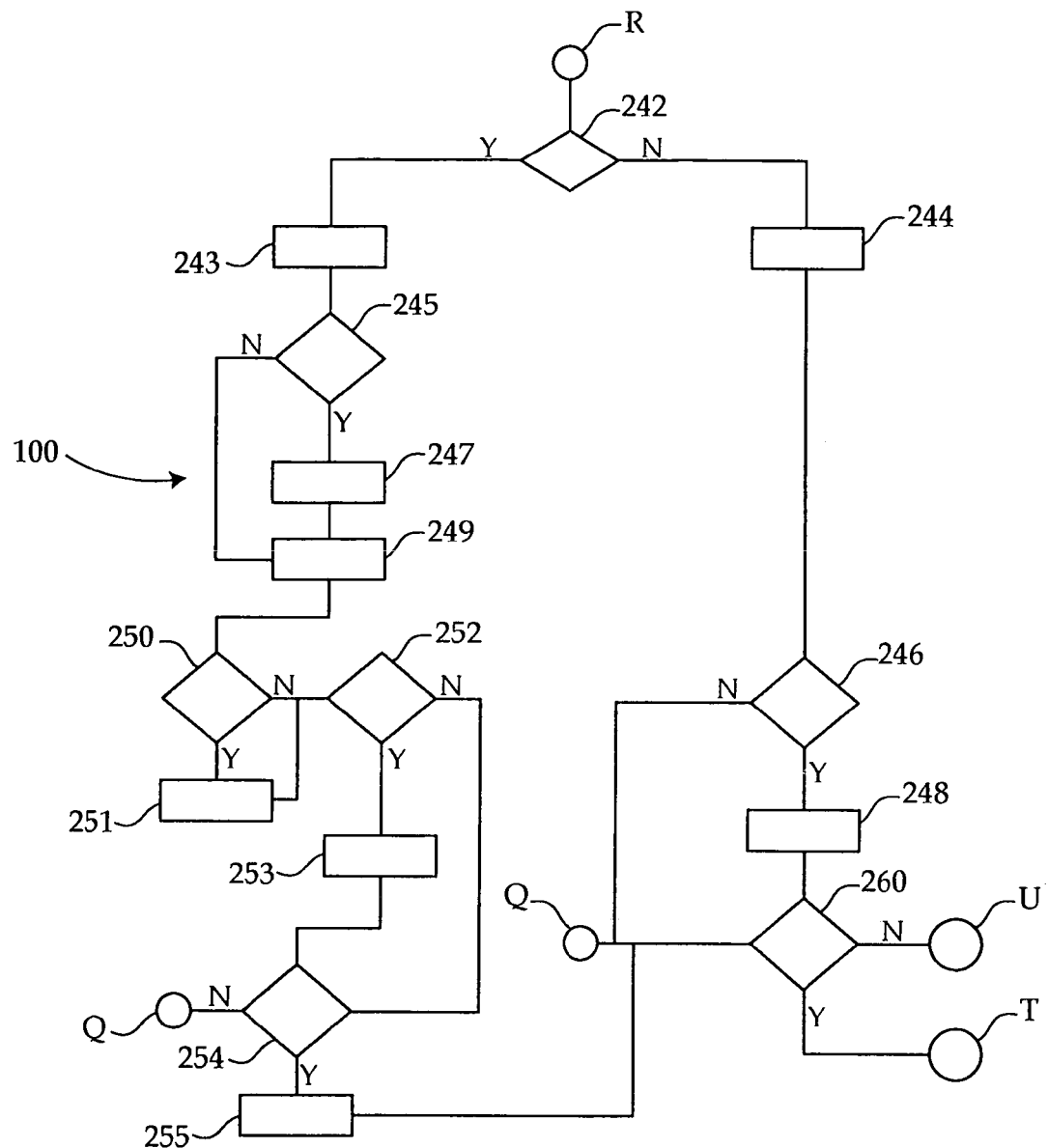
FIG. 7e is a flow chart illustrating another portion of a downshifting process according to the present disclosure.

From Box 240, the process may proceed via Boxes R to Box 242, shown in FIG. 7e, wherein electronic control module 20 will typically determine whether the steady state commanded pump displacement is greater than the actual pump displacement. If no, the process may proceed to Box 244, wherein electronic control module 20 may decrease offgoing clutch pressure and increase the oncoming clutch pressure, then to Boxes 246 and 248, described below.

If steady state commanded displacement is greater than actual pump displacement, by an acceptable margin, at Box 242, the process may proceed to Box 243, wherein electronic control module 20 will typically upstroke pump 14 at the rate described herein. From Box 243, the process will proceed to Box 245 wherein electronic control module 20 will query whether the pump displacement has reached an elevated, for example maximum, displacement.

If yes, then the process may proceed to Box 247 wherein electronic control module 20 will downstroke motor 16 at the rate described herein. If no, then the process may proceed to Box 249 without adjusting motor 16. From either of Boxes 245 or 247 the process will typically proceed to Box 249 wherein electronic control module 20 will increase the oncoming clutch pressure and decrease the offgoing clutch pressure at the rates described herein.

From Box 249 the process may proceed to Box 250 wherein electronic control module 20 will determine whether pump displacement is within an acceptable tolerance of the steady state commanded displacement. If yes, then the process may proceed to Box 251 wherein electronic control module 20 will determine pump displacement equals steady state pump displacement, and thenceforth to Box 252. If no, the process may proceed directly to Box 252 to determine whether motor displacement is within an acceptable tolerance of steady state commanded motor displacement. If motor displacement is within the acceptable tolerance at Box 252, the process may proceed to Box 253 wherein electronic control module 20 will determine motor displacement equals steady state commanded displacement, and thenceforth to Box 254. If no, then the process may proceed directly to Box 254.

At Box 254 electronic control module 20 will typically determine whether each of pump and motor displacements are within an acceptable tolerance of steady state commanded displacements. If yes, Shift Type III Step V will be carried out and the process will proceed to Box 260. If no, Step V will not be carried out, Boxes Q. In either case, however, the process will proceed to Box 260 wherein electronic control module 20 will verify whether Step V is to be undertaken.

Returning to Box 242, if steady state commanded pump displacement is not greater than the actual pump displacement, it will be recalled that the process will proceed to Box 244 wherein electronic control module 20 will decrease the offgoing clutch pressure and increase the oncoming clutch pressure, at the rates described herein. From Box 244, the process may proceed to Box 246 wherein electronic control module 20 will typically determine whether the pump and motor displacements are within an acceptable tolerance of the steady state commanded displacements. If yes, then Step V will be carried out and the process will proceed via Box 248, Step V, to Box 260. If no, Step V will not be carried out and the process will proceed directly to Box 260.

Figure 7F:
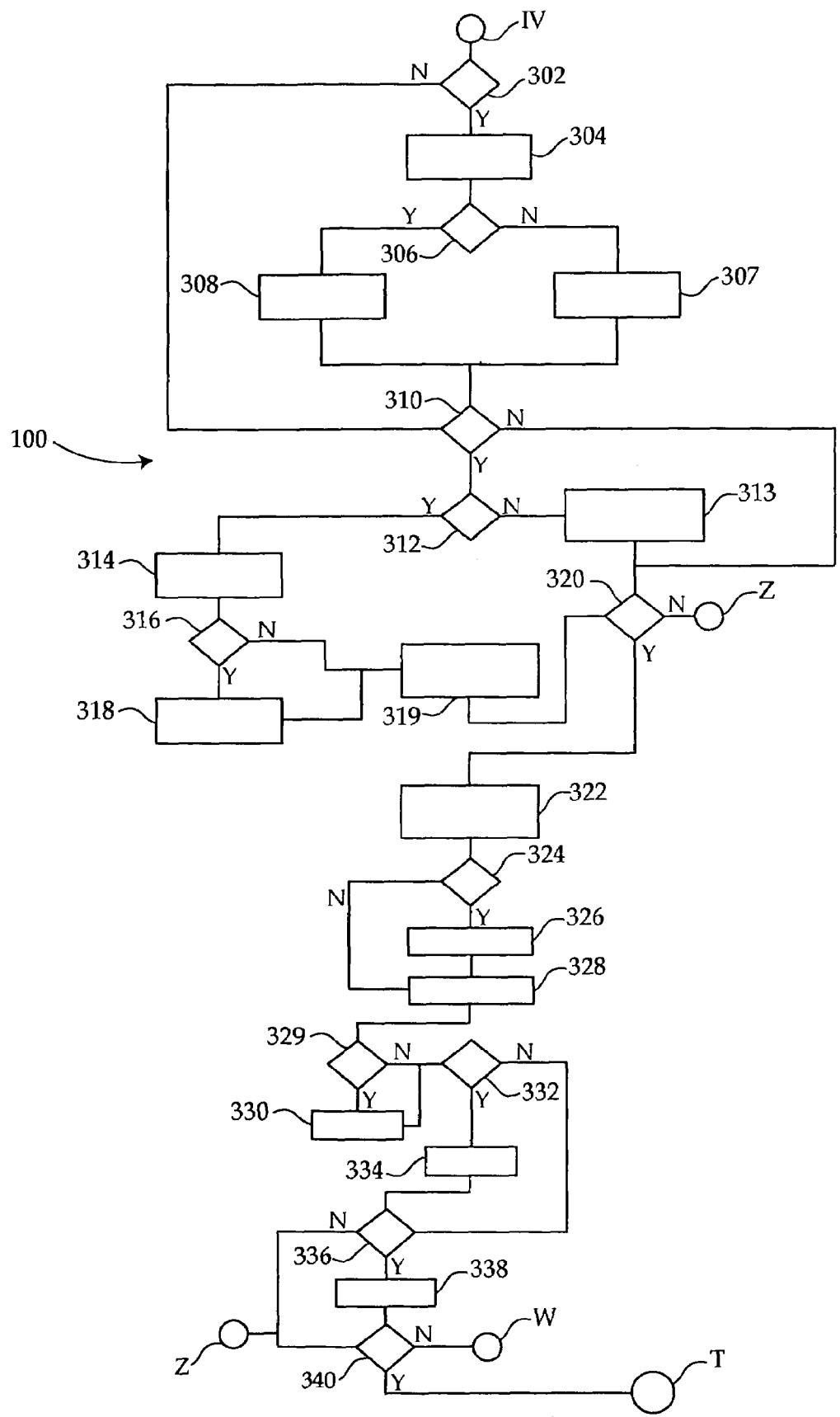
FIG. 7f is a flow chart illustrating another portion of a downshifting process according to the present disclosure.

From Box 260, the process will proceed, if Step V is to be carried out, to Box 202 via Boxes T, and will typically repeat the steps subsequent to Box 202, and concluding Shift Type III by including Step V, returning control of pump 14 and motor 16 to the steady state logic and concluding the downshift. If Step V is not to be carried out, the process will proceed to Box 204 via Boxes U, and will then typically repeat the steps subsequent to Box 204, skipping Step V, but otherwise concluding.

Where a Shift Type IV is selected, the process will proceed following shift detection and selection via Boxes IV to Box 302, shown in FIG. 7f, wherein electronic control module 20 will typically verify whether a Shift Type IV Step II will be carried out. Step II will, generally, include verifying whether high clutch relative velocity is below a desired velocity. If so, electronic control module 20 will typically reduce the pressure on the offgoing clutch at the rate described herein and fill the oncoming clutch. If Step II is not to be carried out, the process will typically proceed to Box 310 wherein electronic control module 20 will determine whether a Shift Type IV Step III is to be carried out, described herein. The particular operations of Step II are as follows.

From Box 302, the process may proceed to Box 304 wherein electronic control module 20 may determine pump and motor displacements are unchanged from the last step. From Box 304, the process proceeds to Box 306 wherein electronic control module 20 will typically query whether high clutch relative velocity is below a desired value. If so, the process may proceed to Step III, Box 307, and thenceforth to Box 310, for verification of Step III.

If the high clutch relative velocity is below the desired value at Box 306, the process will proceed to Box 308 wherein electronic control module 20 will typically reduce the pressure of the offgoing clutch at the rate described herein, and fill the oncoming clutch.

From either of Boxes 307 and 308 the process typically proceeds to Box 310, wherein electronic control module will typically verify whether Step III is to be carried out. If no, the process may proceed to Box 320 wherein electronic control module 20 will verify whether a Shift Type IV Step IV is to be carried out. If Step III is to be carried out, electronic control module 20 will, generally, verify that low clutch relative velocity is below a desired velocity. If no, electronic control module 20 will typically upstroke pump 14 at the rate described herein. Once the pump displacement is at an elevated, for example maximum, displacement, electronic control module 16 may downstroke motor 16 at the rate described herein and drop the pressure on the offgoing clutch at the rate described herein, for example until it reaches zero. The particular operations of Step III are as follows.

From Box 310 the process may proceed to Box 312 wherein electronic control module 20 will determine whether low clutch relative velocity is greater than a predetermined value. If the low clutch relative velocity is not greater than the predetermined value, the process may proceed to Step IV, Box 313. If the low clutch relative velocity is greater than the predetermined value at Box 312, the process may proceed to Box 314 wherein electronic control module 20 may upstroke pump 14 at the rate described herein, then to Box 316 wherein electronic control module 20 will typically verify that pump 14 has reached an elevated, for example, maximum displacement.

If at Box 316 pump displacement has reached the elevated displacement, the process may proceed to Box 318 wherein electronic control module 20 may downstroke motor 16 at the rate described herein. From Box 318 the process may proceed to Box 319. If at Box 316 pump displacement has not reached the elevated displacement, the process may proceed directly to Box 319 without adjusting motor 16. At Box 319, electronic control module 20 will typically decrease the offgoing clutch pressure at the rate described herein, for example until it reaches zero, while maintaining the low clutch pressure.

From Box 319, the process proceeds to Box 320, wherein electronic control module 20 may verify whether Step IV is to be carried out. If Step IV will not be carried out, the process may proceed via Boxes Z to Box 340, described below. Where Step IV is to be carried out, the process will proceed to Box 322. If Step IV is undertaken electronic control module 20 will, generally, verify whether pump and motor displacements are within an acceptable tolerance of steady state commanded displacements. If so, electronic control module 20 will give control back to steady state logic, for example via Step V. The particular operations of Step IV are as follows.

At Box 322 electronic control module 20 will typically adjust pump displacement toward the maximum displacement. In Box 324, electronic control module 20 may then verify whether pump displacement is at its maximum displacement. If no, the process may proceed directly to Box 328. If yes, the process may proceed to Box 326 wherein electronic control module 20 will typically upstroke motor 16 at the rate described herein.

From either of Boxes 326 or 324, the process typically proceeds to Box 328 wherein electronic control module 20 will decrease the offgoing clutch pressure and increase the oncoming clutch pressure at the rates described herein. From Box 328 the process will typically proceed to Box 329, wherein electronic control module 20 will query whether pump displacement is within an acceptable tolerance of steady state displacement. If pump displacement is within the acceptable tolerance, the process may proceed to Box 330 wherein electronic control module 20 will determine the pump displacement is equal to the steady state commanded displacement. From either of Boxes 330 or 329 the process may proceed to Box 332, wherein electronic control module 20 will determine whether motor displacement is within an acceptable tolerance of the steady state commanded displacement. If so, the process may proceed to Box 334 wherein electronic control module 20 will determine motor displacement is equal to steady state displacement. From either of Boxes 332 and 334 the process may proceed to Box 336.

In Box 336, electronic control module 20 will typically verify whether pump and motor displacements are within acceptable tolerances, and whether low clutch pressure is above a predetermined, for example, maximum pressure. If pump and motor displacements are within tolerance, the process will proceed to Box 338, Step V, and then to Box 340. If pump and motor displacements are not within tolerance, Step V will typically not occur and the process will proceed directly to Box 340.

In Box 340, electronic control module 20 will typically query whether Step V will occur, if so the process will return via Boxes T to Box 202 and the downshifting process will typically conclude in a manner similar to that described above. If Step V will not be carried out, the process will proceed via Boxes W directly to Box 204, and conclude, again similar to the above description. It should be appreciated that flowchart 100 is exemplary only, and various departures could be made from the process described therein without departing from the intended spirit and scope of the present disclosure.

The present disclosure thus provides for smoother, more efficient downshifting in a hydrostatic drive work machine. By controlling downshifting in work machine 10 as described herein, shift duration can be as fast as practicable, and thus work machine operating efficiency can be optimized. This will make the time required to decelerate work machine 10 as fast as practicable within the described acceleration and jerk limits. By setting threshold rates for adjusting the various components of hystat drive 11 while downshifting, operators will not be tempted to unduly extend downshifting duration to avoid stalling the work machine or subjecting himself or herself to excessive jerking or decelerations, or causing the ground engaging wheels or tracks to slip. Further, by downstroking motor 16 in advance of a decreased torque demand in a lower gear, any period where hystat system 11 and engine 12 are not appropriately retarding work machine 10 will be relatively short.

Those skilled in the art will appreciate that in systems operating and designed according to the present disclosure, downshifting duration is generally related to the smoothness of the shift, as experienced by the operator, as well as the risk of stalling the work machine or excessive slipping of its clutches. However, reductions in shift duration, i.e. increases in operating efficiency, may come with a trade-off in shift smoothness. The balance struck among shifting efficiency and smoothness, and even clutch wear, will depend in large part upon the preferences of the individuals operating work machine 10, or on such factors as jurisdictional regulations, or hardware limitations.

Where relatively delicate tasks are performed by work machine 10, for example, transporting relatively fragile items, it may be desirable to program electronic control module 20 with acceleration, jerk or torque limits that set a relatively low threshold. In such an application, the balance of smoothness versus efficiency may tend more towards smoothness to ensure work machine 10 experiences only relatively minor decelerations or jerks under normal operation to avoid breaking or dropping the fragile items. Where more rugged tasks are at hand, such as moving a pile of gravel, simply performing the operation as quickly as possible may be the primary concern, and relatively larger acceleration, jerk or torque limits may be appropriate. Thus, if the primary risk of excessive acceleration or jerk is merely spilling gravel, the balance of smoothness and efficiency may tilt more toward efficiency, and relatively rapid downshifting, with relatively larger accelerations and jerks being acceptable.

Further tuning of the shift smoothness and/or shift efficiency can be achieved with relatively minor adjustments of the control algorithm, based on "soft coded" variables. These include pump and motor size, gear ratios, etc. For a relatively larger pump or larger motor, the slowing and accelerating effects on work machine 10 will be different than with a relatively smaller pump or motor. The soft-coded variables can be increased or decreased proportionally to control the upshifting aggressiveness.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For instance, while electronic control module 20 has been described as configured to electronically control all of the components of hystat system 11, one or more of the components might remain operator controlled without departing from the scope of the present disclosure. For instance, embodiments are contemplated wherein motor 16 is adjusted during downshifting by electronic control module 20, but the operator manually controls one or both of the oncoming and offgoing clutch pressures. By adjusting pump 14 and motor 16 electronically, many of the benefits described herein of using pump 14 and pump 16 to slow work machine 10 during shifting, will still be present even where the operator is controlling part of the downshifting process. In such an embodiment, the operator could manually decide at what point work machine 10 has slowed sufficiently to begin downshifting from gear 18b to gear 18a. The disclosure further provides a system that is relatively simple to control, and economical. Other aspects, features and advantages will be apparent upon an examination of the attached drawing Figures and appended claims.

What is claimed is:

1. A method of downshifting in a hydrostatic drive work machine comprising the steps of:
   if upon commanding a downshift in the work machine the work machine is not in a retarded mode, inducing a retarded mode in the same;
   adjusting a displacement of each of a variable displacement pump and a variable displacement motor in a hydrostatic drive of the work machine; and
   increasing pressure on a low clutch of the work machine.

2. The method of claim 1 comprising the step of:
   if upon commanding a downshift in the work machine the work machine is not in a retarded mode, decreasing pressure on a high clutch of the work machine subsequent to initiating the step of inducing the retarded mode, and prior to initiating the step of increasing pressure on the low clutch thereof.

3. The method of claim 2 comprising the step of:
   if upon commanding a downshift in the work machine the work machine is in a retarded mode, allowing the work machine to slow prior to initiating the step of increasing pressure on the low clutch thereof.

4. The method of claim 2 wherein the step of inducing the retarded mode comprises adjusting the displacement of at least one of the pump and the motor prior to initiating decreasing of the high clutch pressure.

5. The method of claim 4 wherein the step of inducing the retarded mode comprises upstroking the motor and downstroking the pump, if a transmission output speed of the work machine is above a predetermined speed, the motor displacement is less than a predetermined displacement, and a throttle setting of the work machine is above a predetermined limit.

6. The method of claim 5 wherein the step of inducing the retarded mode comprises upstroking the motor and downstroking the pump, each at rates based on one or both of a predetermined acceleration limit and a predetermined jerk limit of the work machine.

7. The method of claim 5 wherein the step of inducing the retarded mode comprises upstroking the motor to an increased displacement without adjusting the displacement of the pump, if a transmission output speed of the work machine is above a predetermined speed and the motor displacement is less than the predetermined displacement, but the throttle setting is above a predetermined limit.

8. The method of claim 7 wherein the step of inducing the retarded mode comprises upstroking the motor to the increased displacement at a rate based on one or both of a predetermined acceleration limit and a predetermined jerk limit of the work machine.

9. The method of claim 1 comprising the step of:
selecting one of at least four downshifting types with an electronic control module in the work machine, based at least in part on a transmission output speed, a throttle setting and the motor displacement thereof.

10. The method of claim 9 wherein the selecting step comprises:
selecting a first downshifting type, if a transmission output speed of the work machine is above a predetermined speed, a throttle setting of the work machine is above a predetermined limit and the motor displacement is less than a predetermined displacement;
selecting a second downshifting type, if the transmission output speed of the work machine is above the predetermined speed and the throttle setting is above the predetermined limit, but the motor displacement is greater than the predetermined displacement;
selecting a third downshifting type, if the transmission output speed is greater than the predetermined speed and the throttle setting is less than the predetermined limit; and
selecting a fourth downshifting type, if the transmission output speed is less than the predetermined speed and the motor displacement is above the predetermined displacement.

11. The method of claim 1 comprising the steps of:
determining whether the work machine is in a retarded mode upon commanding the downshift, based at least in part on a transmission output speed, a throttle setting and the displacement of the motor; and
if upon commanding the downshift the work machine is not in a retarded mode, inducing a retarded mode therein by at least one of, upstroking the motor and downstroking the pump.

12. An article comprising:
a computer readable medium having a control algorithm recorded thereon, said control algorithm including means for inducing a retarded mode in a work machine hydrostatic drive that includes a variable displacement motor and a variable displacement pump, if upon commanding a downshift the work machine is not in a retarded mode.

13. The article of claim 12 wherein said means for inducing a retarded mode comprises means for adjusting a displacement of at least one of, the variable displacement motor and the variable displacement pump.

14. The article of claim 13 wherein said control algorithm further includes:
means for determining if said work machine is in a retarded mode, based at least in part on a transmission output speed, the displacement of said motor, and a throttle setting in said work machine;
means for decreasing a high clutch pressure and increasing a low clutch pressure in said work machine;
said means for inducing a retarded mode including means for inducing the same for a predetermined time period, prior to decreasing the high clutch pressure and increasing the low clutch pressure.

15. The article of claim 14 wherein said means for inducing a retarded mode includes means for:
if said work machine is not in a retarded mode, adjusting both of said pump and said motor, if the throttle setting is above a predetermined limit, and adjusting only said motor, if the throttle setting is below the predetermined limit.

16. The article of claim 15 wherein said control algorithm further comprises means for:
if said work machine is in a retarded mode, decreasing the high clutch pressure toward a slip point at a constant rate, if the throttle setting is above the predetermined limit, and decreasing the high clutch pressure toward the slip point at a non-constant rate, if the throttle setting is below the predetermined limit.

17. The article of claim 12 wherein said control algorithm further comprises means for commanding one of at least four downshifting types in said work machine, said means for commanding including:
means for commanding a first downshifting type, if a transmission output
speed of the work machine is above a predetermined speed, a throttle setting of the work machine is above a predetermined limit and the motor displacement is less than a predetermined displacement;
means for commanding a second downshifting type, if the transmission output speed of the work machine is above the predetermined speed and the throttle setting is above the predetermined limit, but the motor displacement is greater than the predetermined displacement;
means for commanding a third downshifting type, if the transmission output speed is greater than the predetermined speed and the throttle setting is less than the predetermined limit; and
means for commanding a fourth downshifting type, if the transmission output speed is less than the predetermined speed, but the motor displacement is above the predetermined displacement.

18. A hydrostatic drive work machine comprising:
a variable displacement pump;
a variable displacement motor coupled with said pump;
a transmission coupled with said motor; and
an electronic control module in control communication with each of said motor and said pump, said electronic control module including a computer readable medium with a control algorithm recorded thereon, said control algorithm including means for retarding said work machine with one or both of said motor and said pump, if the work machine is not in a retarded mode upon commanding a downshift.

19. The hydrostatic work machine of claim 18 wherein said means for retarding is a first means operable to selectively adjust displacement of one or both of said motor and said pump during downshifting, based predominantly on the sum of a plurality of retarding forces on said work machine, said control algorithm further comprising:

second means operable to selectively adjust displacement of said motor and said pump during downshifting, based predominantly on a relative gear ratio of a high gear and a low gear in said transmission; and third means operable to selectively adjust displacement of said motor and said pump prior and subsequent to downshifting, based predominantly on a ground speed and a throttle setting in said work machine, respectively.

20. The hydrostatic drive work machine of claim 19 wherein:

said first means comprises means for retarding said work machine with both of said motor and said pump, if the throttle setting of said work machine is above a predetermined limit, and means for retarding said work machine with only said motor, if the throttle position is below the predetermined limit; and said control algorithm further includes means for, decreasing a high clutch pressure of said work machine at a first rate if the throttle position of said work machine is above the predetermined limit, and decreasing the high clutch pressure at a second rate, if the throttle position is below the predetermined limit.

* * * * *

UNITED STATES PATENT AND TRADEMARK OFFICE
CERTIFICATE OF CORRECTION

PATENT NO.         : 7,247,122 B2                                   Page 1 of 1
APPLICATION NO. : 11/033796
DATED              : July 24, 2007
INVENTOR(S)        : Shah It is certified that error appears in the above-identified patent and that said Letters Patent is hereby corrected as shown below:

In Column 9, Line 29, delete "machline" and insert -- machine --, therefor.

In Column 11, Line 30, delete "ti" and insert -- $.t_1$ --, therefor.

In Column 13, Line 8, after "Box" delete "10" and insert -- 110 --, therefor.

Signed and Sealed this

Fifteenth Day of July, 2008

JON W. DUDAS
*Director of the United States Patent and Trademark Office*